United States Patent
Draznin et al.

(10) Patent No.: US 11,916,732 B1
(45) Date of Patent: Feb. 27, 2024

(54) END-TO-END SERVICE CREATION, MANAGEMENT, AND ORCHESTRATION IN MOBILE NETWORKS

(71) Applicant: Microsoft Technology Licensing, LLC, Redmond, WA (US)

(72) Inventors: Sagiv Draznin, Walnut Creek, CA (US); Pankaj Goyal, Cherry Hills Village, CO (US); Karthik Ananthakrishnan, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/071,837

(22) Filed: Nov. 30, 2022

(51) Int. Cl.
*H04L 41/0806* (2022.01)
*H04L 41/40* (2022.01)
(Continued)

(52) U.S. Cl.
CPC ...... *H04L 41/0806* (2013.01); *H04L 41/0895* (2022.05); *H04L 41/145* (2013.01); *H04L 41/40* (2022.05); *H04L 43/55* (2022.05)

(58) Field of Classification Search
CPC ......... H04L 41/00; H04L 41/12; H04L 41/08; H04L 41/0806; H04L 41/0895;
(Continued)

(56) References Cited

U.S. PATENT DOCUMENTS 10,448,242 B2 * 10/2019 Georgiev ................ H04L 67/51
11,343,161 B2 * 5/2022 Thakkar ................ H04L 41/122
(Continued)

OTHER PUBLICATIONS

M. Zhao et al., "Verification and validation framework for 5G network services and apps," 2017 IEEE Conference on Network Function Virtualization and Software Defined Networks (NFV-SDN), Berlin, Germany, 2017, pp. 321-326 (Year: 2017).*

(Continued)

*Primary Examiner* — Brendan Y Higa
(74) *Attorney, Agent, or Firm* — Mark K. Young; Mark K. Young P.C.

(57) ABSTRACT

An end-to-end service delivery system provides customers representing mobile network and enterprise operators with an online repository for services that are created from virtual network functions, and which are available from multiple service creators and operable across infrastructure underlying the customer's software-defined networking-based mobile network including diverse private, public, and hybrid cloud platforms. The network functions delivery system provides a user interface (UI) exposing a catalog of differentiated services of varying types. When the customer selects a service from the catalog, the service delivery system uses an installation engine to deploy the selected service on the customer's mobile network. The system provides a lifecycle management and orchestration engine that orchestrates the deployed service on an end-to-end basis across domains and network platforms. The service delivery system troubleshoots the service installation if deployment problems arise and notifies the customer of issues through the UI to provide recommendations and solutions.

20 Claims, 25 Drawing Sheets

(51) Int. Cl.
    *H04L 43/55*     (2022.01)
    *H04L 41/0895*   (2022.01)
    *H04L 41/14*     (2022.01)

(58) Field of Classification Search
    CPC ......... H04L 41/22; H04L 41/40; H04L 43/20; H04L 41/14–149; H04L 43/50–55; H04L 43/55

See application file for complete search history.

(56) References Cited

U.S. PATENT DOCUMENTS

| | | | |
|---|---|---|---|
| 2017/0272523 A1* | 9/2017 | Cillis | H04L 41/40 |
| 2018/0337931 A1* | 11/2018 | Hermoni | H04L 63/0823 |
| 2021/0266228 A1* | 8/2021 | Reehil | H04L 41/122 |
| 2022/0036418 A1* | 2/2022 | Bikumala | H04L 41/145 |
| 2022/0210010 A1* | 6/2022 | Ritchie | H04L 41/022 |
| 2023/0032088 A1* | 2/2023 | Goswami | G06F 11/36 |

OTHER PUBLICATIONS

S. Van Rossem et al., "A network service development kit supporting the end-to-end lifecycle of NFV-based telecom services," 2017 IEEE Conference on Network Function Virtualization and Software Defined Networks (NFV-SDN), Berlin, Germany, 2017, pp. 1-2 (Year: 2017).*

D. Pezzolla, et al., "Defining a Generic OR-VNFM Interface for Configuring Network Functions," 2016 Fifth European Workshop on Software-Defined Networks (EWSDN), Den Haag, Netherlands, 2016 (Year: 2016).*

U. Acar, R. F. Ustok, S. Keskin, D. Breitgand and A. Weit, "Programming Tools for Rapid NFV-Based Media Application Development in 5G Networks," 2018 IEEE Conference on Network Function Virtualization and Software Defined Networks (NFV-SDN), Verona, Italy, 2018, pp. 1-5 (Year: 2018).*

* cited by examiner

| Service | Service type | Life-cycle management | Component manifest | Supported users/devices | Add on features |
|---|---|---|---|---|---|
| Service A | IoT use cases | - Core network<br>- Networking<br>- Monitoring<br>- Security | - 2 user plane (active/standby)<br>- 2 control plane (active/standby)<br>- 3 subnets<br>- EMS<br>- 2 firewall (active/standby) | 1000 | Deep packet inspection (DPI) |
| Service B | Data use cases | - Core network<br>- Networking<br>- Monitoring<br>- Security | - 4 user plane (active/standby)<br>- 6 subnets<br>- EMS<br>- 4 firewall | 5000 | TCP optimization |

1400

110

2400

END-TO-END SERVICE CREATION, MANAGEMENT, AND ORCHESTRATION IN MOBILE NETWORKS

BACKGROUND

Network functions that have traditionally been performed by dedicated hardware devices (e.g., firewalls, gateways, routers, switches, load balancers, etc.) are being performed in today's mobile networks, such as fifth generation (5G) mobile networks, with general-purpose computers running in cloud-computing data centers using network function virtualization (NFV) technologies deployed in software-defined networking (SDN) architectures. The term "virtualized network function" (VNF) refers to a software-based implementation of a network function. Individual VNFs can be chained or combined together and used in sequence to implement a network service.

SUMMARY

An end-to-end service delivery system provides customers representing mobile network and enterprise operators with an online repository for services created from virtualized network functions (VNFs) that are available from multiple service creators and operable across infrastructure underlying the customer's software defined networking (SDN)-based mobile network including diverse private, public, and hybrid cloud platforms. The service delivery system provides a user interface (UI) exposing a catalog of differentiated services of varying types. Responsively to customer selection of a service from the catalog, the service delivery system uses an installation engine to deploy the selected service on the customer's mobile network. The service delivery system provides a lifecycle management (LCM) and orchestration engine that orchestrates the deployed service on an end-to-end basis across domains and network platforms. The service delivery system troubleshoots the service installation if deployment problems arise and notifies the customer of issues through the UI to provide recommendations and solutions. With a successful end-to-end service deployment, the service delivery system interacts with a commercial system to create a suitable billing record for the customer.

In various illustrative embodiments, the end-to-end service delivery system includes a service creation entity that exposes a set of service development and composition tools that are accessible through a UI to service creators. A composition engine provides machine learning (ML)-supported automation to facilitate the creation of recipes for end-to-end services. A development sandbox simulating the customer's network deployment environment enables service creators to utilize testing and verification tools to validate that services created from the recipes and exposed to customers in the catalog meet applicable requirements.

The service creation entity is interoperable with the customer's cloud-computing infrastructure to monitor network configuration and operating state including availability of compute, memory, storage, and networking resources. The service creation entity interacts through an application programming interface (API) with a deployment environment in the customer's network, such as a dedicated network slice on a fifth-generation (5G) mobile network. The service creation entity operates in an automated manner, using ML in some cases, to streamline end-to-end service deployment for the customer, improve deployment success rates, and reduce the time needed to roll out new services, upgrades and improvements, patches, and features.

The service creation entity leverages its increased scope of control and access to the deployment environment—including, for example, knowledge of applicable customer rules and policies, access to network resource managers, and possession of required rights and permissions—to simplify deployment for the customer through the automated LCM and orchestration in an NFV (network functions virtualization) management and orchestration (MANO) component in the customer's mobile network. Resources can be pre-provisioned in the deployment environment to speed rollout for new mobile network services while reducing potential deployment issues.

The present end-to-end service delivery system provides numerous technical advantages to mobile network and enterprise customers and service creators. For service creators, using the system's automated tools to create, test, and verify end-to-end service recipes included in the end-to-end service catalog leverages economies of scale to increase the customer base for their offerings across a range of diverse cloud-computing infrastructure. This incentivizes service creators to build out rich feature sets as vendor lock-in is minimized by the open market paradigm that is supported by the catalog-based approach to end-to-end service development. For customers, the service delivery system provides automation for service deployment and LCM orchestration on an end-to-end basis. Time to deploy network services, features, and upgrades is reduced and overall network reliability is improved compared to conventional manual deployment methods. By being recipe-based, end-to-end services are readily scalable and repeatable across diverse infrastructure and mobile network topologies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter is capable of implementation as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 10 shows illustrative network services of different types;

Like reference numerals indicate like elements in the drawings. Elements are not drawn to scale unless otherwise indicated.

DETAILED DESCRIPTION

NFV and SDN provide a flexible mobile network model on which to base today's modern mobile networks. However, the provisioning of new services for mobile networks can be time consuming and involve significant amounts of manual work. Conventional creation of new services includes deployment of various combinations of VNFs that typically require manual configuration, testing, and verification while providing for suitable security practices and service monitoring. The challenges with service creation are compounded from an end-to-end service perspective which means services need to be orchestrated across different infrastructure domains, for example, device, access network, core network, transport network, network management systems, and provider networks.

The present end-to-end service creation, management, and orchestration in mobile networks is realized by a cloud-based delivery system that automates processes for new services to be provisioned and deployed in a customer's mobile network on an end-to-end basis with appropriate security and monitoring functionalities in place. The delivery system implements an end-to-end network service pipeline supporting three phases. 1) end-to-end service composition that enables service creators to compose and stress test new service offerings using a simulated mobile network in a software development sandbox prior to deployment; 2) exposure of composed service offerings in an online catalog that is accessible by customers (e.g., customers representing mobile network operators or enterprises); and 3) automated deployment of services on an end-to-end basis in a customer's deployment environment, such as 5G network slice, with automated life cycle management and orchestration across all applicable infrastructure domains.

Figure 1:
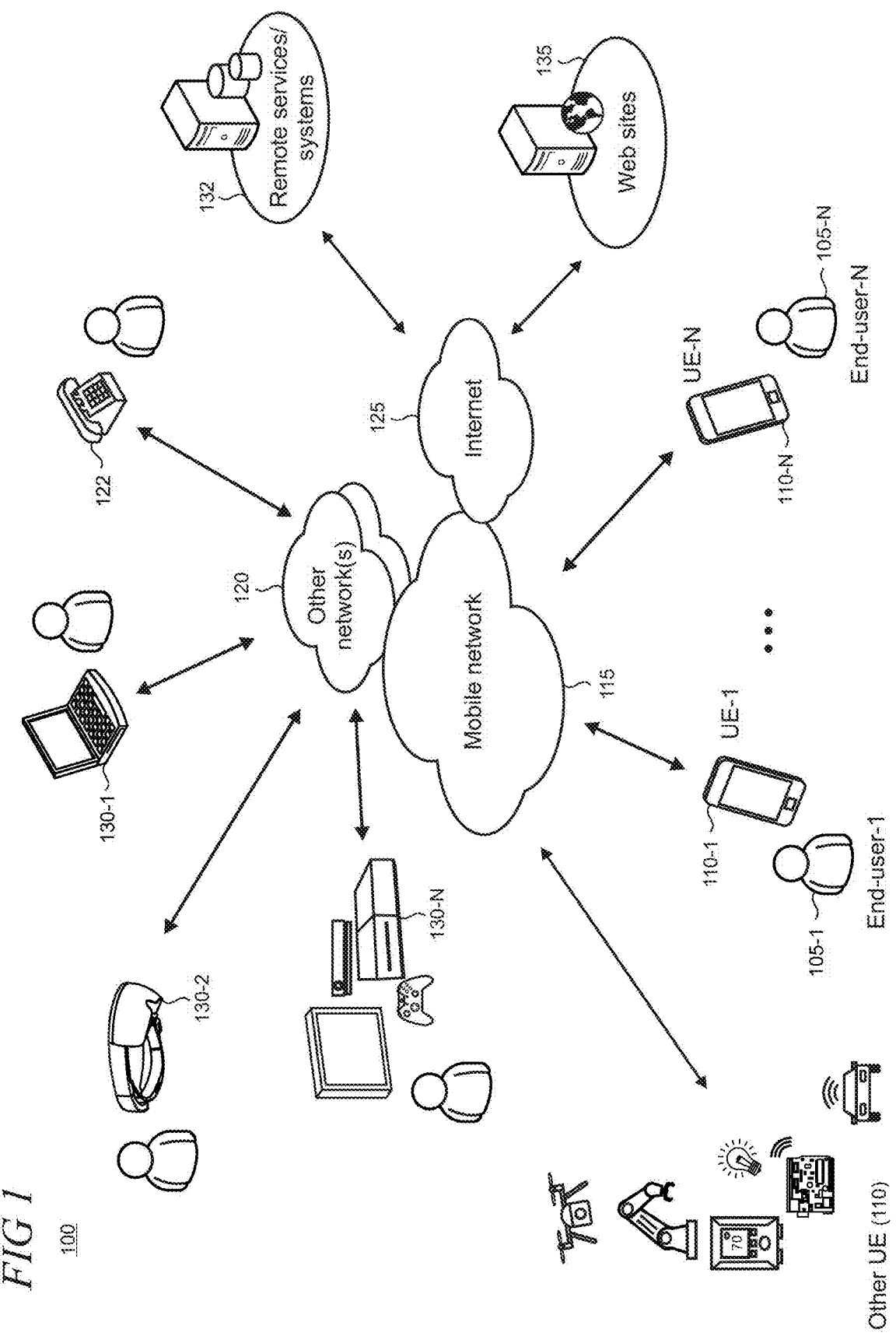
FIG. 1 shows an illustrative mobile telecommunications environment in which computing devices and associated users communicate over a mobile network with other devices and services.

Turning now to the drawings, FIG. 1 shows an illustrative telecommunications environment 100 in which the same or different end-users 105 employ various computing devices, generally referred to as "user equipment" (UE) 110, that communicate wirelessly with other computing devices and various services over a mobile network 115. In some cases, other networks (representatively indicated by reference numeral 120) are supported in the telecommunications environment. The networks 115 and 120 typically include different network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks.

Some of the end-users 105 and UE 110 have an association such as a subscription, contract, plan, or the like with one of the networks 115 and 120 (or are otherwise authorized to access and use the network), while other end-users and computing devices have an association with another one of the networks. The depiction of two networks in this example is illustrative, as the number of networks utilized in the telecommunications environment 100 can vary by implementation.

The UE 110 shown in FIG. 1 are representative of the wide variety of device types that utilize mobile networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. Other types of telephony equipment are optionally present in the telecommunications environment 100 such as conventional desktop phones 122 which are operatively coupled to a public switched telephone network ("PSTN"). Other examples include equipment that connects to the PSTN using private branch exchanges ("PBXs") and equipment coupled to call services that are accessed using telephone numbers. Other types of computing devices 130, such as personal computers (PCs), laptop computers, multimedia consoles, mixed- and virtual-reality display systems and the like are generally configurable and equipped to support telephony applications in some cases.

The mobile network 115 includes interfaces supporting connections to public networks such as the Internet 125 so that UE 110 is enabled to access content and render end-user experiences provided by various remote or cloud-based application services 132 and websites 135. The application services and websites typically support a diversity of features, services, and end-user experiences such as social networking, mapping, news and information, entertainment, travel, productivity, finance, electronic commerce (e-commerce), etc. The application services and websites are collectively referred to as application services in the description that follows.

Figure 2:
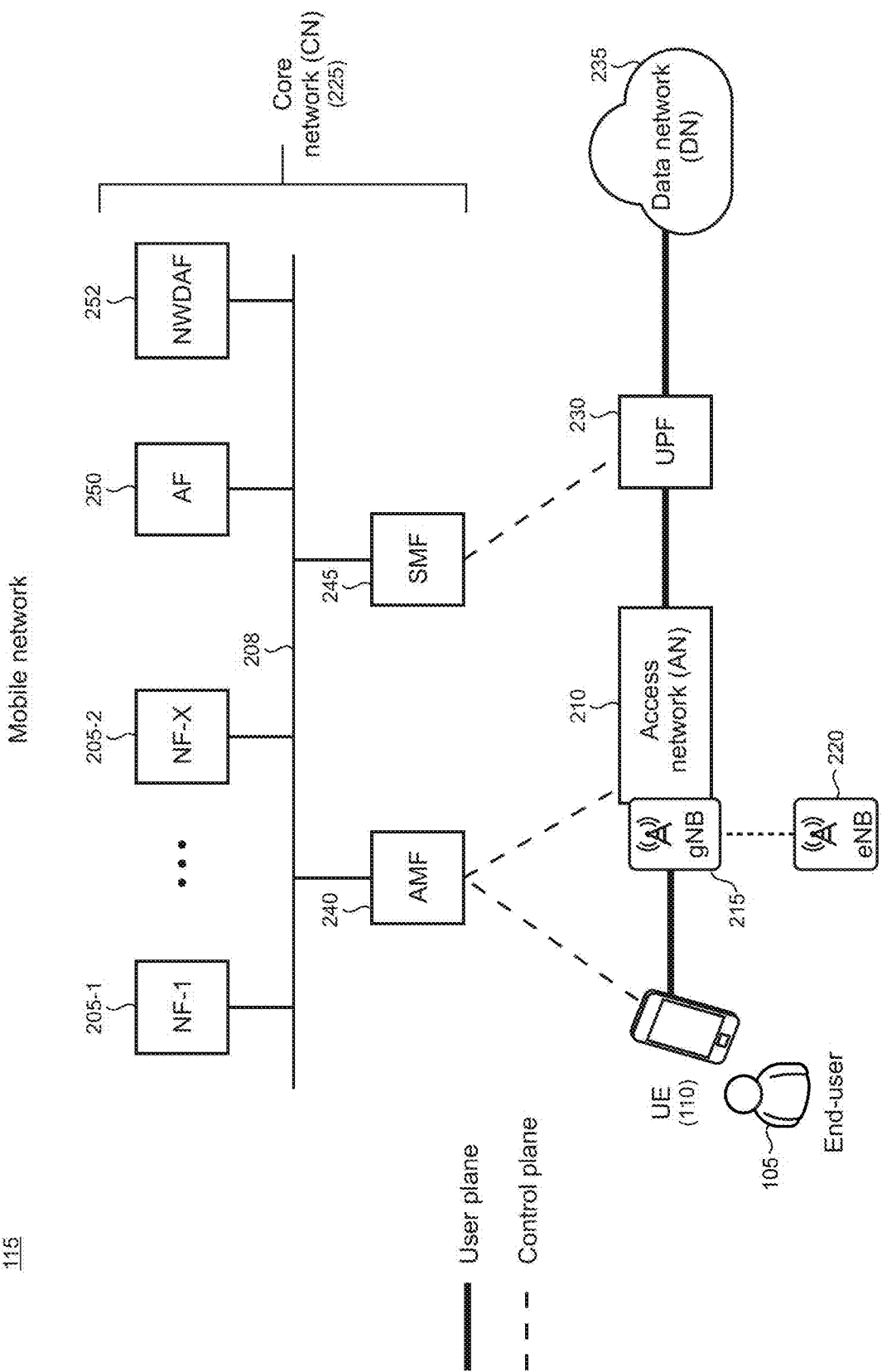
FIG. 2 shows an illustrative mobile network that uses a service-based architecture.

FIG. 2 shows an illustrative mobile network 115 that uses a service-based architecture (SBA) as defined by the 3GPP (3rd Generation Partnership Project). SBAs provide a modular framework from which common applications can be deployed using components of varying sources and vendors. In SBAs, control plane functionality and common data repositories of a 5G network are delivered by way of a set of network functions 205 that are interconnected with a service-based interface bus 208, in which each has authorization to access each other's services. Assuming the role of either service consumer or service producer, network functions are self-contained, independent, and reusable. Each network function service exposes its functionality through a Service Based Interface (SBI), which employs a well-defined REST (Representational State Transfer) interface using HTTP/2 (Hypertext Transfer Protocol Version 2). The SBA of modern mobile networks enables Network Function Virtualization (NFV) and Software Defined Networking (SDN) to be implemented at scale.

In this illustrative example, the mobile network comprises 5th-generation (5G) mobile network infrastructure in a standalone (SA) architecture. However, it may be appreciated that the present principles may be adapted in some cases to non-standalone (NSA) architectures in which the 5G access network (AN) 210 is used in conjunction with existing 4th-generation (4G) LTE (Long Term Evolution) and EPC (Evolved Packet Core) infrastructure. In this scenario, in addition to a 5G gNB 215 operating a radio base station, a 4G eNB 220 is connected to the 5G AN via an X2 interface to provide NSA capabilities. In SA in which 5G is fully deployed, network functions may be utilized in both the 5G core network (CN) 225 and the AN, while in NSA, only 4G services are supported in the 4G EPC, so network function deployment is limited to the 5G AN in such cases.

As shown in FIG. 2, a UPF (user plane function) 230 handles user data performing operations such as maintaining PDU (protocol data unit) sessions, packet routing and forwarding, packet inspection, policy enforcement for the user plane, QoS (Quality of Service) handling, traffic usage reporting for billing, and the like. The UPF further provides an interconnection point between the mobile network infrastructure and an external data network (DN) 235.

An AMF (access and mobility management function) 240 receives all connection and session related information from the UE 110 but is responsible only for handling connection and mobility management tasks such as registration and authentication, identification, and mobility. All messages related to session management are forwarded over an interface to the SMF (session management function) 245 that establishes and manages sessions. It also selects and controls the UPF 230 and handles paging. The AF (application function) 250 provides service or application related information to the network function service consumer. For example, the AF may perform operations such as retrieving resources and exposing services to end-users 105.

An NWDAF (network data analytics function) 252 is a 3GPP standard functionality used to collect data from a UE, network function, operations, administration, and maintenance (OAM) systems, etc., the 5G core, cloud, and edge networks which may be used for analytics. In some applications, data collected from the NWDAF is utilized to facilitate the various end-to-end service automation features that are discussed below.

Figure 3:
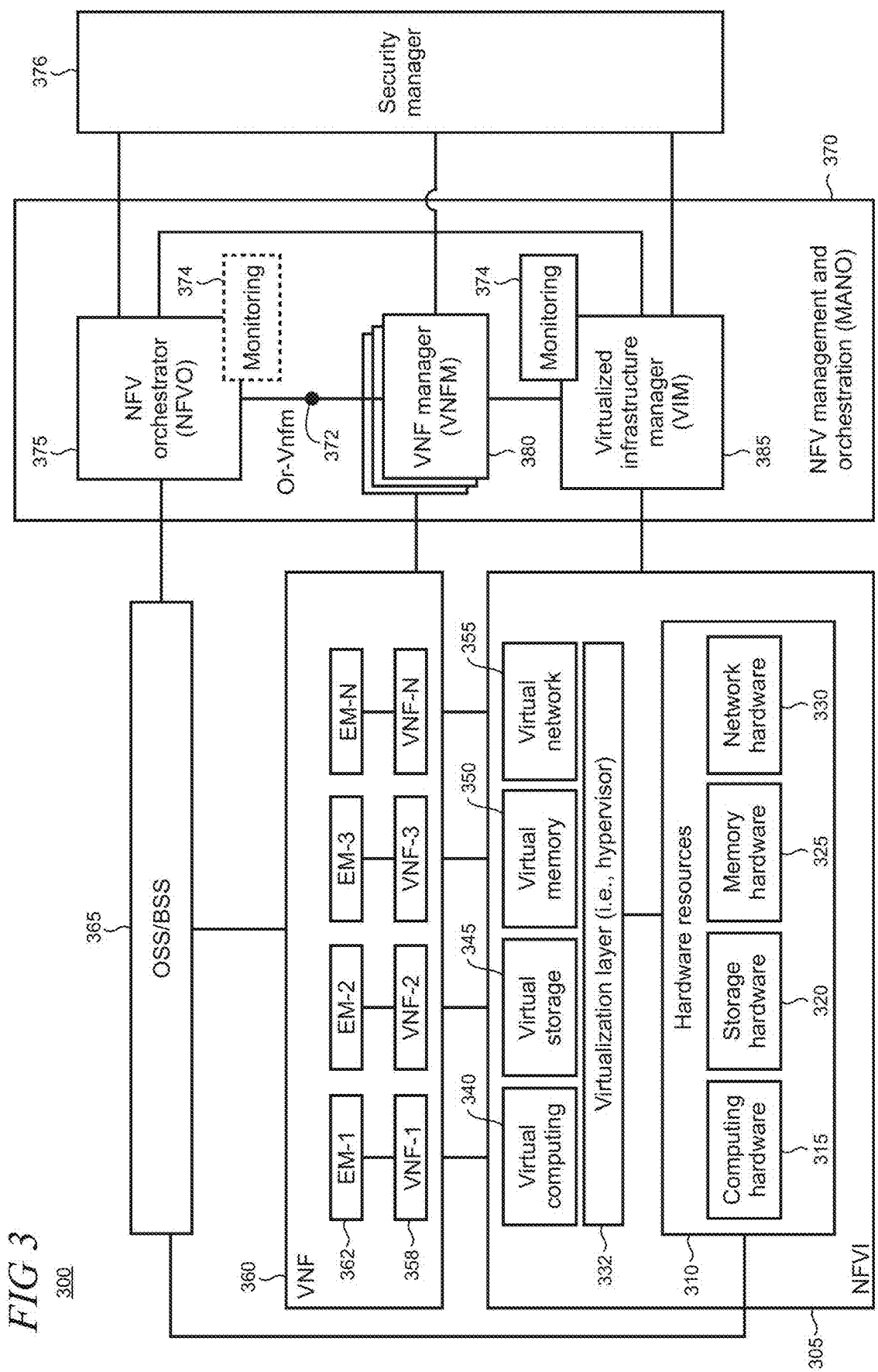
FIG. 3 shows an illustrative network functions virtualization (NFV) architectural framework.

FIG. 3 shows an illustrative NFV architectural framework 300 that is described by the European Telecommunications Standards Institute (ETSI). The framework includes NFV infrastructure (NFVI) 305 that is an abstraction of physical hardware resources 310 including compute (i.e., computing servers) 315, storage 320, memory 325, and networking 330 as well as the hypervisor code that implements a virtualization layer 332 to thereby support respective virtualized counterparts, as respectively indicated by reference numerals 340, 345, 350, and 355.

A VNF (representatively indicated by reference numeral 358) in a VNF layer 360 of the framework 300 is a virtualization of a network function in a legacy non-virtualized mobile network. However, the functional behavior and state of a network function are largely independent of whether the network function is virtualized or not. The functional behavior and the external operational interfaces of a physically embodied network function and a VNF are expected to be the same. Element management (EM) 362 performs typical management functionality for one or more VNFs, for example, managing faults, configurations, accounting, performance, security, and the like.

At the top of the framework 300 are operation support systems (OSS) and business support systems (BSS) that comprise the mobile network operator's back-end systems that manage, for example, networks, services, end-user customers, products, and orders. The OSS/BSS 365 communicates with an NFV MANO 370 which provides the framework for management and orchestration of all the resources in an NFV environment including, for example, deploying and operating the VNF to provide network services on the virtualized resources, and managing the lifecycle of VNF and NS instances to fulfill the business benefits for service providers. The NFV MANO interacts with EM 362 to manage the logical function and assure service levels of the VNFs in the VNF layer 360 spanning across the management of VNF fault, configuration, accounting, performance, and security.

The NFV MANO includes an NFV orchestrator (NFVO) 375 that typically orchestrates one or more VNFs into network services and manages the lifecycle of those network services. A VNF manager (VNFM) 380 interoperates with the NFVO over an Or-Vnfm interface 372 to manage the lifecycle of VNF instances including, for example, instantiating, updating, upgrading, scaling, healing and/or terminating a VNF. Each VNF instance is associated with a VNFM.

A virtualized infrastructure manager (VIM) 385 manages the resources of the NFVI 305 and exposes the NFVI capabilities to upstream systems in the framework including the VNF managers 380 and NFVO 375. The VIM collects performance and fault information for hardware, software, and virtualized resources and forwards performance measurement results and faults/events information relative to virtualized resources to the other systems. The VIM 385 is adaptable, in this illustrative example, to include a monitoring system 374 to monitor deployment, events, and performance associated with a given VNF, collection of VNFs, and/or an end-to-end service that is instantiated in a mobile network in accordance with the present principles. The monitoring system can also be implemented as a standalone system or alternatively be instantiated in the NFVO, as indicated by the dashed rectangle, with appropriate adaptation.

In an illustrative implementation, VNF- and/or service-specific monitoring rules can be assigned to the monitoring system 374 at the time of provisioning for VNFs during end-to-end service installation in accordance with the present principles. For example, the monitoring rules may include a list of VNF components associated with a given VNF and/or service along with a list of corresponding performance parameters that have to be monitored for each VNF component.

In an illustrative implementation, the NFV architecture 300 is configurable to implement a security manager 376 to accommodate VNF- and/or service-specific security policies for a given VNF and/or end-to-end service, in accordance with the present principles. The security manager is responsible for enforcing security policies for VNFs and for instructing NFV-MANO 370 to take VNF-specific, service-specific, or system wide security actions.

Figure 4:
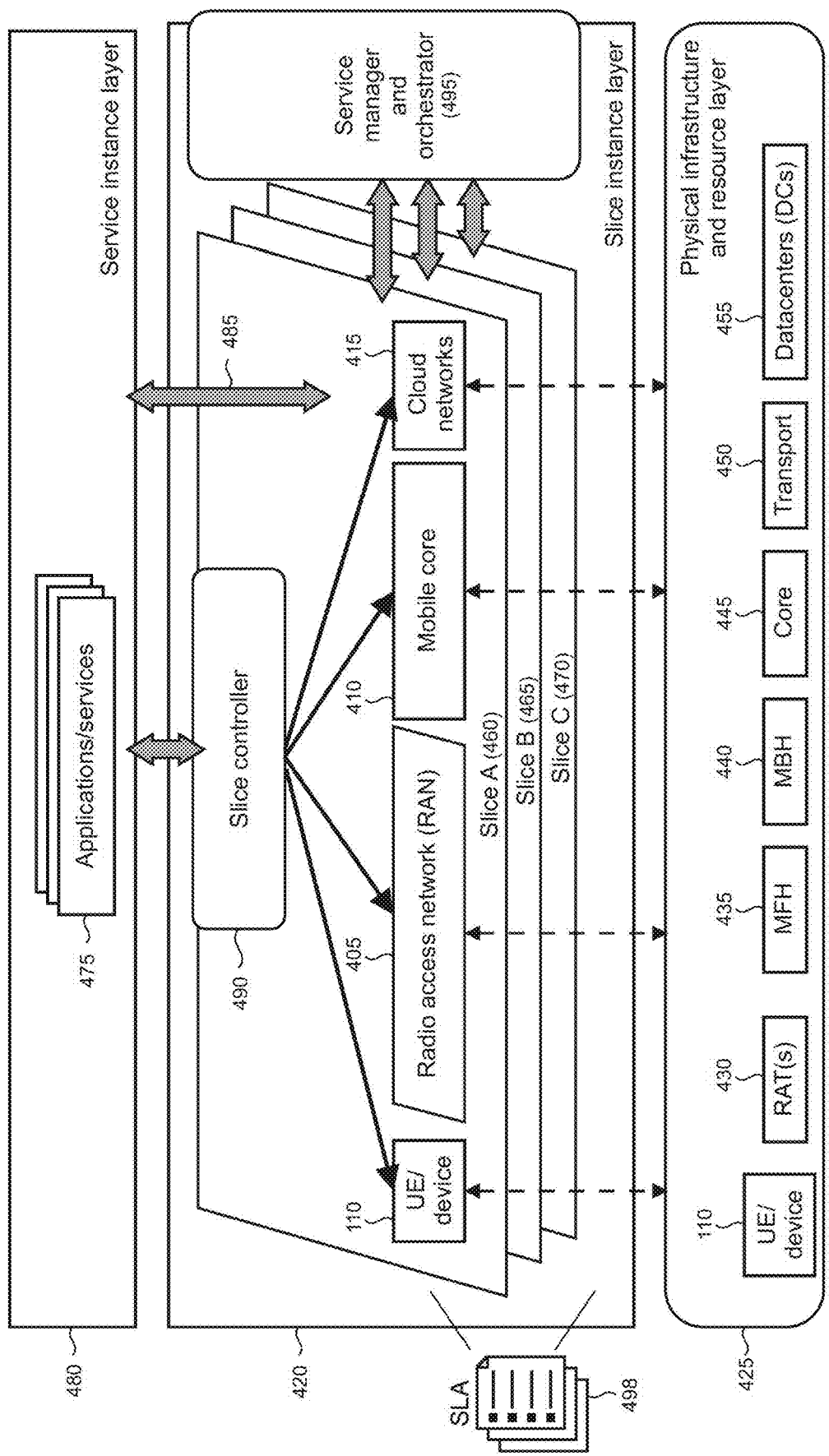
FIG. 4 shows an illustrative layered 5G network framework.

FIG. 4 shows an illustrative layered 5G network slicing framework 400 that is described in International Telecommunication Union Radiocommunication Sector ITU-R M.2083-0. Network slicing allows a 5G network operator to provide dedicated logical networks (i.e., network slices) with customer specific functionality. The 5G architecture enables different network configurations in different network slices.

The framework 400 comprises a RAN 405, mobile packet core 410, and cloud networking components 415 that are logically represented in a network slice instance layer 420 that sits above a physical infrastructure layer 425 in the framework. The physical infrastructure layer provides an abstraction of radio, compute, network, and storage resources that are elements of distinct domains which may include, for example, one or more RATs 430, mobile fronthaul (MFH) 435, mobile backhaul (MBH) 440, mobile core network 445, transport 450, and one or more datacenters (DCs) 455. In some cases, one or more UE instances may be implemented as resources.

In this illustrative example, the slice instance layer includes three 5G network slices—slice A 460, slice B 465, and slice C 470—but more or fewer slices may be utilized in any given implementation at any given time. These slices may include, for example, one or more standardized slice types defined under 3GPP TS 23.501 including enhanced Mobile Broadband (eMBB), Ultra-Reliable and Low Latency Communications (URLLC), massive Internet-of-Things (MIoT), Vehicle-to-Everything (V2X), and High-Performance Machine Type Communications (HMTC).

Slices may be isolated by logically or physically isolating their underlying resources. The slices can support instances of various applications and/or services (collectively indicated by reference numeral 475) in a service instance layer 480, for example, using an application programming interface (API), as representatively indicated by reference numeral 485. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 490 is utilized with the slicing framework 400 to maintain awareness of the application requirements to responsively allocate and manage the virtualized network functions and resources in each slice. A service manager and orchestrator 495 combines the necessary resources and functions to produce a network slice instance. Its main tasks include creation of slice instances upon the underlying physical infrastructure, dynamically mapping network functions to slice instances to meet changing context, and maintaining communication between the application and services and the framework to manage slice lifecycle.

As shown, an SLA 498 is typically applicable to each of the slices 460, 465, and 470. The applicable SLAs can vary in scope and composition. The slice controller 490 may be advantageously utilized to perform resource allocation among RAN slices to meet the connectivity requirements while ensuring compliance with applicable SLA guarantees in some cases.

An SLA may be defined as a contract, between the provider of a service and its internal or external end-user or customer, that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported in a given 5G network, typically depending on applicable circumstances and context. For example, customers may include, but are not limited to, consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Conventional deployment processes for mobile network services are generally time-consuming because the development of NFV-based services requires configuration of multiple network functions that operate in combination. In cases in which a VNF is acquired from a third-party developer, technical and commercial terms can be vendor-specific, at least in part, as VNFs offerings are not standardized, and therefore not always straightforward to interoperate. Mobile network operators thus typically face significant obstacles when attempting to provide new service offerings, maintain or upgrade existing services, and maximize operating efficiency as their networks evolve to meet challenges in the competitive mobile telecommunications industry.

Figure 5:
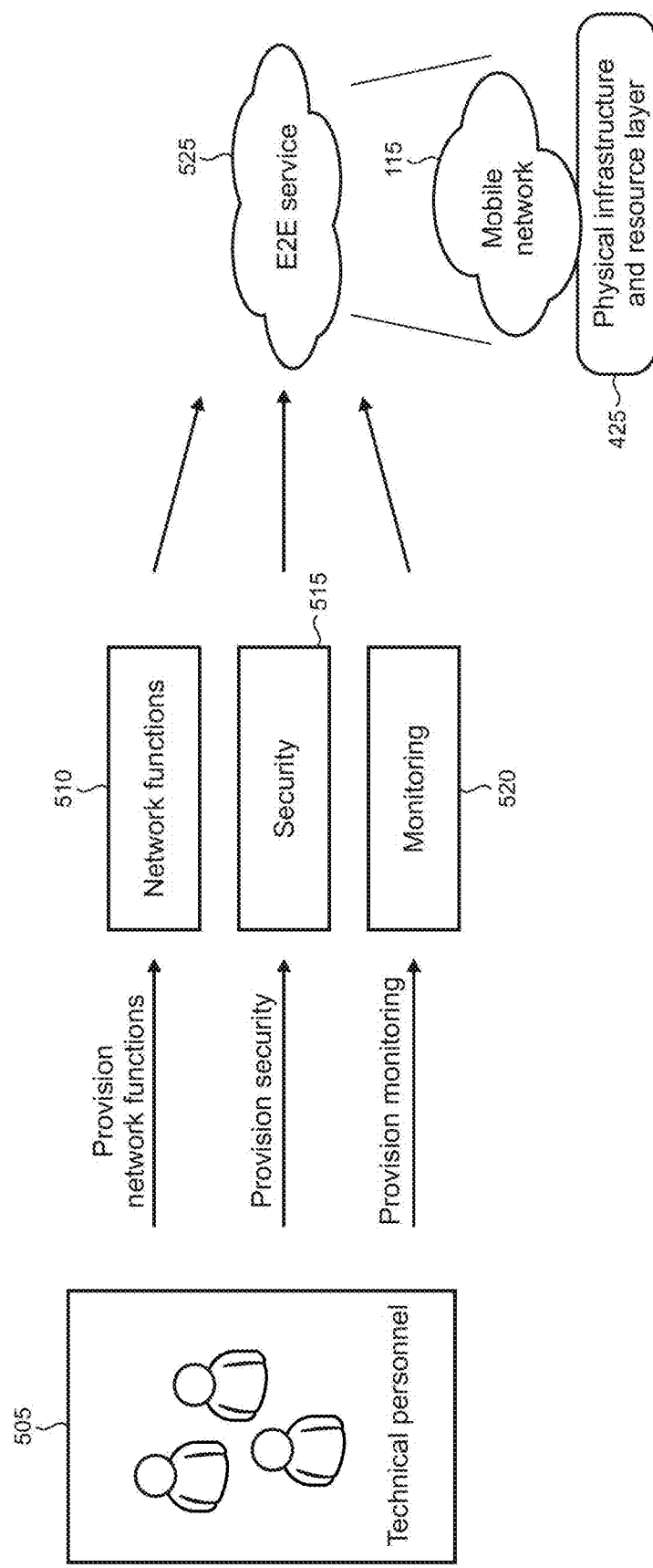
FIG. 5 shows illustrative conventional actions of mobile network operator (MNO) personnel when deploying an end-to-end network service.

Conventionally, technical personnel 505 use separate and distinct manual processes to deploy new network services including provisioning appropriate network functions 510 that are constituent components of the services along with the associated security provisioning 515, and monitoring provisioning 520, as shown in FIG. 5. Security provisioning typically includes planning for security policies, policy enforcement, and security monitoring. Provisioning of monitoring for network services is typically performed on a per-user, per-service, and/or per-device basis.

For end-to-end network services 525 (the term "end-to-end" is abbreviated "E2E" in the drawings), the provisioning processes for new network services are applied to each domain underlying the physical infrastructure of the mobile network. As discussed above with reference to FIG. 4, the domains include, for example, UE, radio access networks, mobile core networks, transport networks, and datacenters in the physical infrastructure and resource layer 425. The infrastructure domains involve and span across different service providers in some cases, which can add complexity to the provisioning processes for end-to-end services.

Significant manual work is typically required to ensure that an end-to-end service is operational across the diverse domains to provide desired features with appropriate QoS, availability, and reliability, and that the service is fully tested and verified prior to rollout, with all required security and monitoring functionalities in place. Conventional manual processes to develop and roll out new network services can provide satisfactory results for some deployments. However, the processes are time consuming and labor intensive and are not always well suited to today's dynamic application-driven mobile network environment. Particularly with 5G mobile networks, operators would benefit from a new services development model that enhances competitiveness in delivering new network services faster, while decreasing capital and labor expenses.

Network functions life cycle management (LCM) is another challenge to be addressed for end-to-end services to be properly instantiated in a mobile network. LCM for the full lifecycle of end-to-end services, from design and testing to assurance, is typically desired. End-to-end services orchestration in multi-domain and multi-service scenarios is highly complex and will generally exceed the capabilities of the manual processes discussed above. However, service orchestration as an architectural layer and software solution is in its infancy in the 5G networking space, and standardized approaches in production environments are still being developed (for example, ETSI has its Zero-Touch Network and Service Management (ZSM)). As a result, mobile network operators are facing significant obstacles when attempting to provide new end-to-end service offerings while maintaining and/or upgrading existing services and maximizing operating efficiency as their SDN-based mobile networks evolve to meet challenges in the competitive mobile telecommunications industry.

Figure 6:
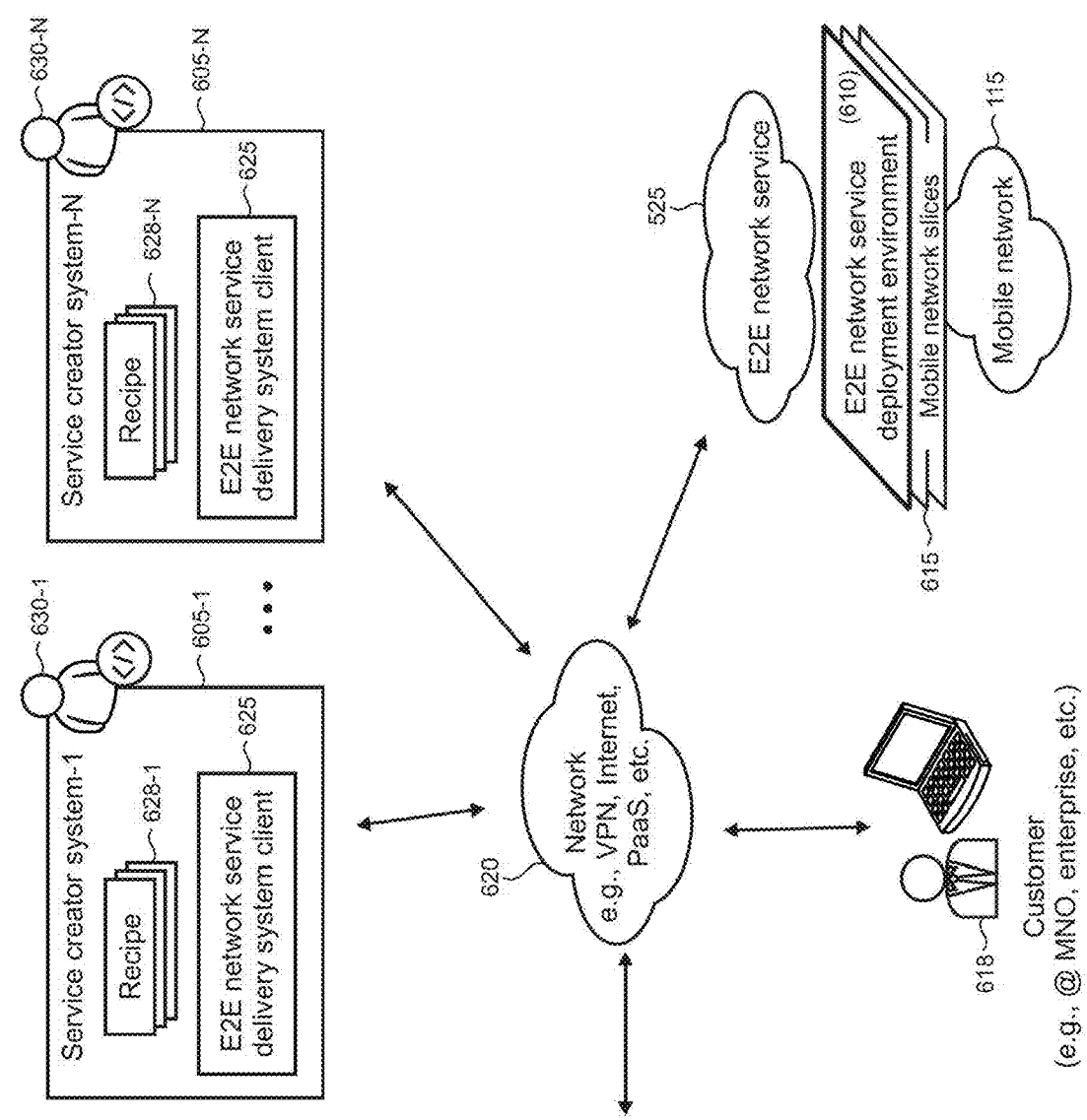
FIG. 6 shows illustrative components of an illustrative end-to-end network service delivery system that interoperates with service creator systems and a mobile network.

FIG. 6 shows illustrative components of the present end-to-end network service delivery system 600. The network service delivery system interacts with service creator systems 605 and a deployment environment 610 that may be implemented, for example, using one or more slices 615 of a mobile network 115. A customer 618 (representing, for example, a mobile network operator or enterprise), the delivery system, and service creator systems interact over a communications network 620 such as a virtual private network (VPN), the Internet or other public networks, Platform as a Service (PaaS) network, or other suitable network. An instance of an end-to-end network service delivery system client 625 is utilized in the service creator systems 605 to facilitate onboarding of end-to-end service recipes 628 by service creators 630 using the network service delivery system 600. An overview of the delivery system is provided next, followed by more detailed descriptions of the components thereof.

As shown, the components of the end-to-end service delivery system 600 include an application programming interface (API) 635 to enable interactions with the service creator systems 605. Various tools can be exposed to the service creators 630 through a service composition user interface (UI) 640 that provides functionalities for composing recipes for end-to-end services that are included in a catalog 645. Testing and validation tools 650 interact with a service development sandbox 655 that is exposed to the service creators to comprehensively stress test and validate the recipes prior to being created as end-to-end network services and exposed in the catalog. In some implementations, the tools are arranged or extended to facilitate ongoing management of end-to-end service recipes by the service creators, once onboarded to the system, such as updates, fixes, versioning support, and the like.

The composed, tested, and validated recipes 665 are uploaded as elements of software libraries 670 that are stored in an online repository 675. A service creation entity 660 is a principal component in the end-to-end network service delivery system 600 that creates services from the validated recipes in the software libraries and has overall management and control responsibilities for the service creation and validation, exposure, and deployment pipeline. The service creation entity is described in more detail in the text accompanying FIG. 11.

The customer 618 accesses the catalog 645 using a UI 680. Various tools are exposed to the customers including E2E network service deployment tools 685 that facilitate the service installation in the customer's mobile network, and in particular, the deployment environment 610. The deployment tools include monitoring tools to enable the customer to monitor deployment, events, and performance associated with a given installed end-to-end network service. The monitoring tools can be implemented as a part of a stand-alone system in some scenarios or be configured for interoperation with existing customer monitoring systems in other scenarios.

The deployment tools 685 interoperate with the service creation entity 660 which, in turn, operates through an API 690 to the NFVI 305 (FIG. 3) underlying the mobile network. Network profiles and other data pertaining to a given customer may be stored locally (e.g., in the online repository 675 or other local database) and utilized by the service creation entity to facilitate network service installation in the deployment. For example, in some implementation scenarios, the service creation entity monitors network configuration and operating state including availability of compute, memory, storage, and networking resources in the customer's mobile network. The service creation entity is thus provided with increased scope of control and access to the deployment environment in these scenarios, such as having knowledge of applicable customer rules and policies, access to network resource managers, and possession of required rights and permissions—to simplify end-to-end service installation and facilitate LCM orchestration, as discussed below.

Figure 7:
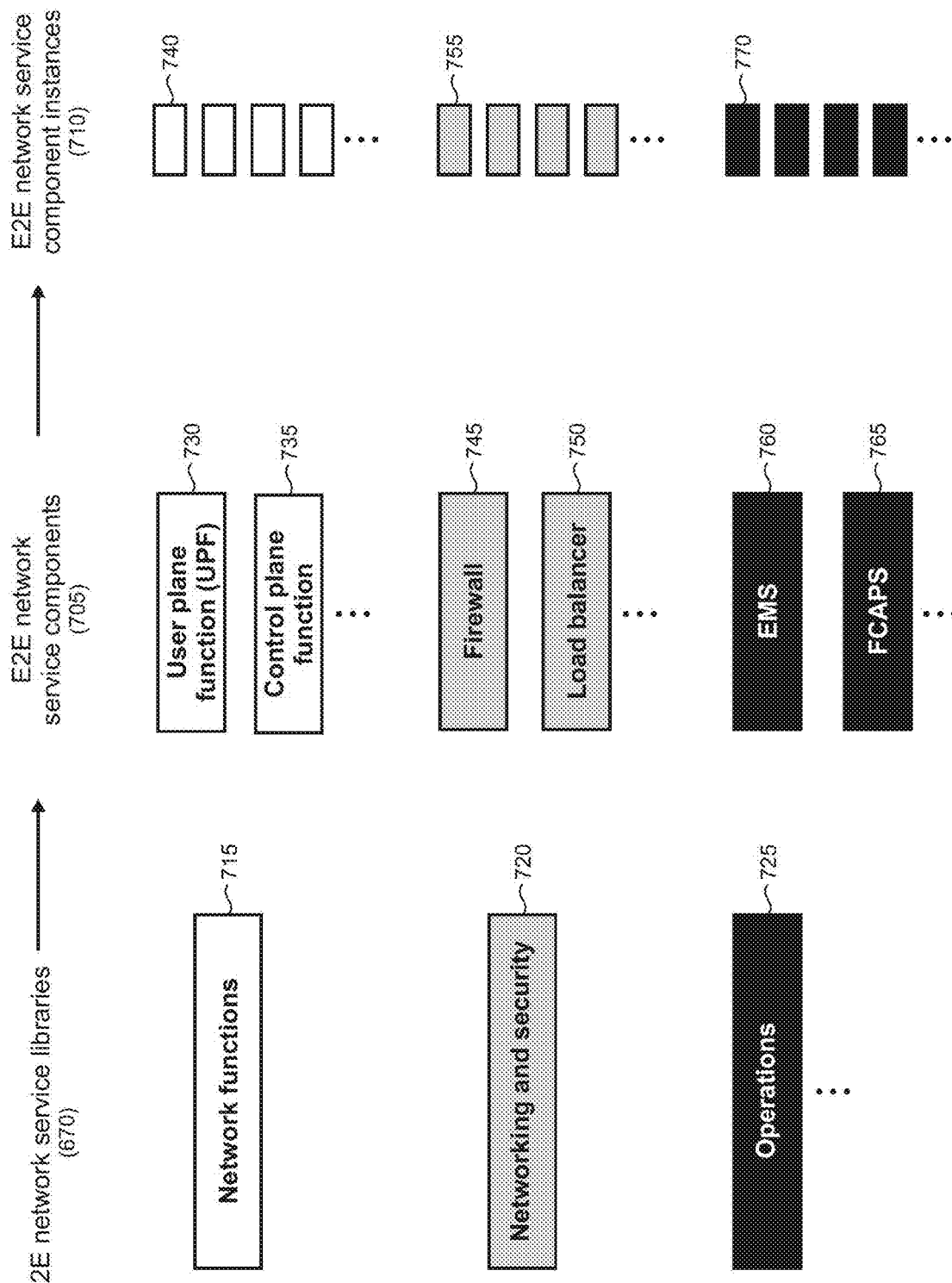
FIG. 7 shows illustrative elements from which libraries of end-to-end network services are composed.

FIG. 7 shows illustrative elements from which libraries of end-to-end services are composed. The elements include libraries 670, components 705, and component instances 710 that are arranged in a taxonomy that extends from left to right in the drawing. A given end-to-end service can utilize one or more instances of the components included in libraries. The elements shown in the drawing and described herein are exemplary and not limiting with respect to the scope of the present principles. The end-to-end network service libraries illustratively include network functions 715, networking and security 720, and operations 725.

Exemplary components in the network functions library 715 include user plane function (UPF) 730 and control plane function 735 of which multiple instances (representatively indicated by reference numeral 740) may be utilized to implement an end-to-end network service. The networking and security library 720 illustratively includes firewall 745 and load balancer 750 components of which multiple instances 755 are utilizable. The operations library 725 illustratively includes EMS (element management system) 760 and FCAPS (fault, configuration, accounting, performance, and security) model 765 components of which multiple instances 770 are utilizable.

Figure 8:
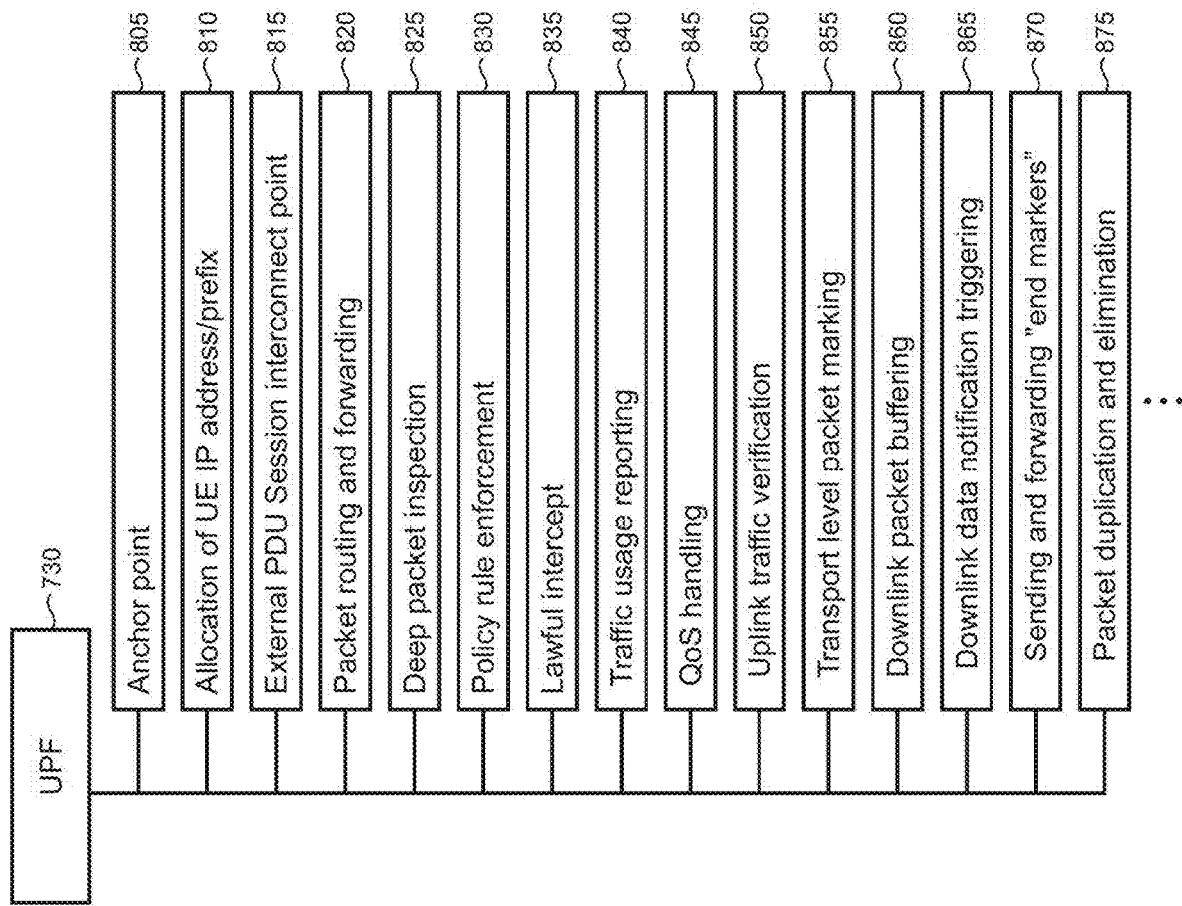
FIG. 8 shows illustrative examples of functionalities that are supportable by instances of a user plane function (UPF)

It may be appreciated that the particular configuration of the instances of components used to realize an end-to-end service can have varied functionality as required and appropriate. For example, FIG. 8 shows illustrative and non-limiting examples of functionalities that are supportable by instances of the UPF 730. The UPF functionalities are defined in the technical specification 3GPP TS 23.501. Other component instances in the service libraries have functionalities described in literature published by 3GPP and/or other standards organizations.

Some or all of the functionalities may be supported in a single instance of a UPF. As shown, the UPF functionalities include: anchor point for intra-inter-RAT mobility, when applicable (as indicated by reference numeral 805); allocation of UE IP address/prefix, if supported, in response to a request from the SMF 245 (FIG. 2) (810); external PDU (protocol data unit) session point of interconnect to DN 235 (FIG. 2) (815); packet routing and forwarding, for example, support of an uplink classifier to route traffic flows to an instance of a DN, support of branching point to support a multi-homed PDU session, support of traffic forwarding within a 5G virtual network group (820); deep packet inspection (DPI), for example, application detection based on a service data flow template and the optional packet file descriptions (PFDs) received from the SMF (825); the user plane portion of policy rule enforcement, for example, gating, redirection, traffic steering (830); lawful intercept (i.e., data collection by the UPF) (835); traffic usage reporting (840); QoS handling for the user plane, for example, uplink/downlink rate enforcement, reflective QoS marking in the downlink (845); uplink traffic verification (i.e., service data flow to QoS mapping) (850); transport level packet marking in the uplink and downlink (855); downlink packet buffering (860); downlink data notification triggering (865); sending and forwarding of one or more "end markers" to the source RAN 405 (FIG. 4) (870); packet duplication in downlink direction and elimination in uplink direction for user data in the GPRS (general packet radio service) tunneling protocol, GTP-U, layer (875).

Figure 9:
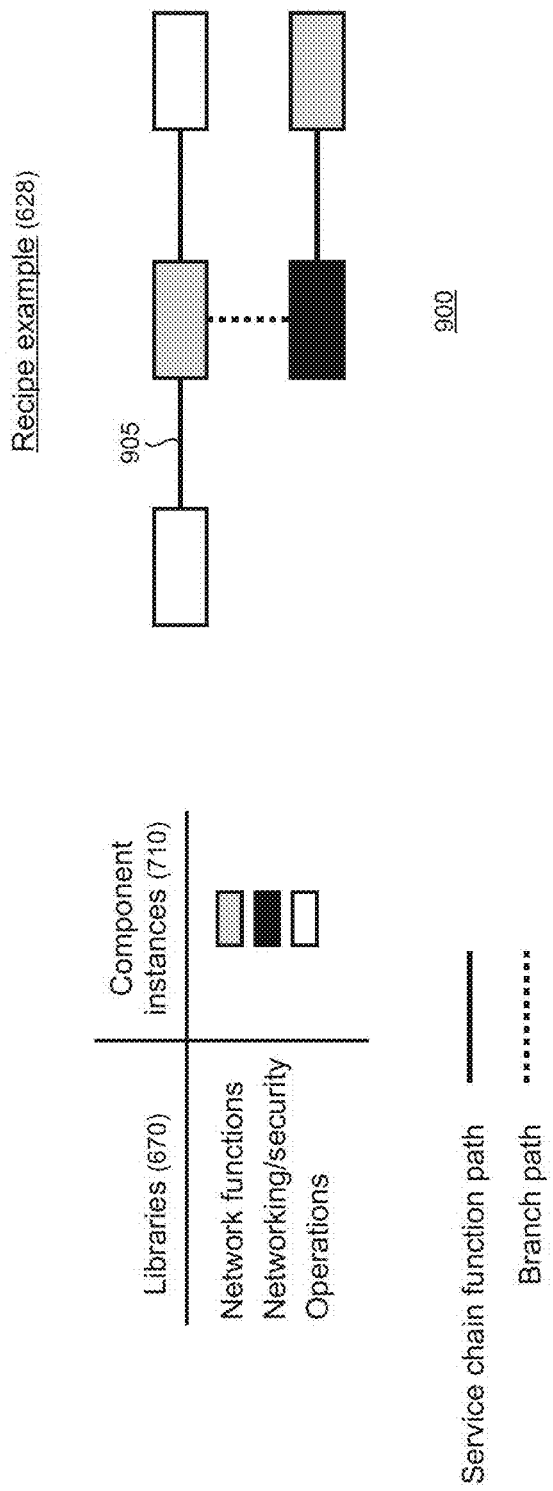
FIG. 9 shows an illustrative composition of end-to-end network service component instances that form a recipe.

FIG. 9 shows an illustrative composition of end-to-end service component instances that form a recipe 628. The composed recipe shown in FIG. 9 is arbitrary for illustration purposes. Service creators 630 (FIG. 6) compose recipes by selecting components from the libraries 670 and connecting various instances 710 using a service chain function path (representatively indicated by reference numeral 905). Request for Comments (RFC) publications RFC 7665 and RFC 7498 describe service function chains as definition, instantiation, and steering of network traffic through an ordered set of network service functions. As described in the RFC literature, a network service is an offering composed of several elements within the MNO's mobile network. Alternatively, a network service is defined as a discrete element that hosts a set of service functions and has a network locator where the service is hosted.

A service function chain defines an ordered set of abstract service functions and ordering constraints that must be applied to packets and/or frames and/or flows selected as a result of a classification process. An example of an abstract service function is a "firewall" in which the implied order may not be a linear progression as the architecture allows for service function chains that copy to more than one branch, and also allows cases where there is flexibility in the order in which service functions need to be applied.

In FIG. 9, the component instances in the recipe 628 form a graph 900 that establishes an abstracted view of a network service that specifies service functions and an execution order. Each node represents a required existence of at least one abstract service function. Each node can be part of zero, one, or multiple service function chains, and a node can appear one time or multiple times in a given service function chain. Service function chains can be unidirectional, bidirectional, and/or branched, and may utilize cycles such that data traffic traverses the nodes more than once when implementing a network service.

The end-to-end network services facilitated by the present service delivery system can take various forms and types. FIG. 10 shows a set 1000 of illustrative services of different types arranged in a column format. Service A supports a typical use case for IoT devices such as low-latency, low-bandwidth telemetry signaling while Service B supports a typical use case for data usage for UE. LCM and orchestration have similar requirements across the different service types in this example, while the component (i.e., service function) manifest for each service varies. Different numbers of users/devices are supported by the services and various optional or add-on features are provided. In the IoT use case for Service A, a deep packet inspection security feature is provided. For Service B, the data handling is optimized by fine tuning TCP (transport control protocol) data traffic to decrease round-trip latency and improve data throughput.

In some implementations, the service types and columnar data in FIG. 10 is exposed, wholly or partly, to the customer 618 (FIG. 6) in the catalog 645. The layout and design of the catalog can vary by implementation. Typically, the catalog is organized to enable customers to browse for end-to-end services and obtain relevant information about service types, use cases, service features, deployment requirements, costs, and the like. Suitable control elements may be supported in the UI 680 to enable the customer to interact with the catalog such as browsing, searching, setting filtering criteria, and the like. The catalog advantageously enables customers to compare and contrast end-to-end network service offerings from different service creators 630 on an equivalent basis.

Figure 11:
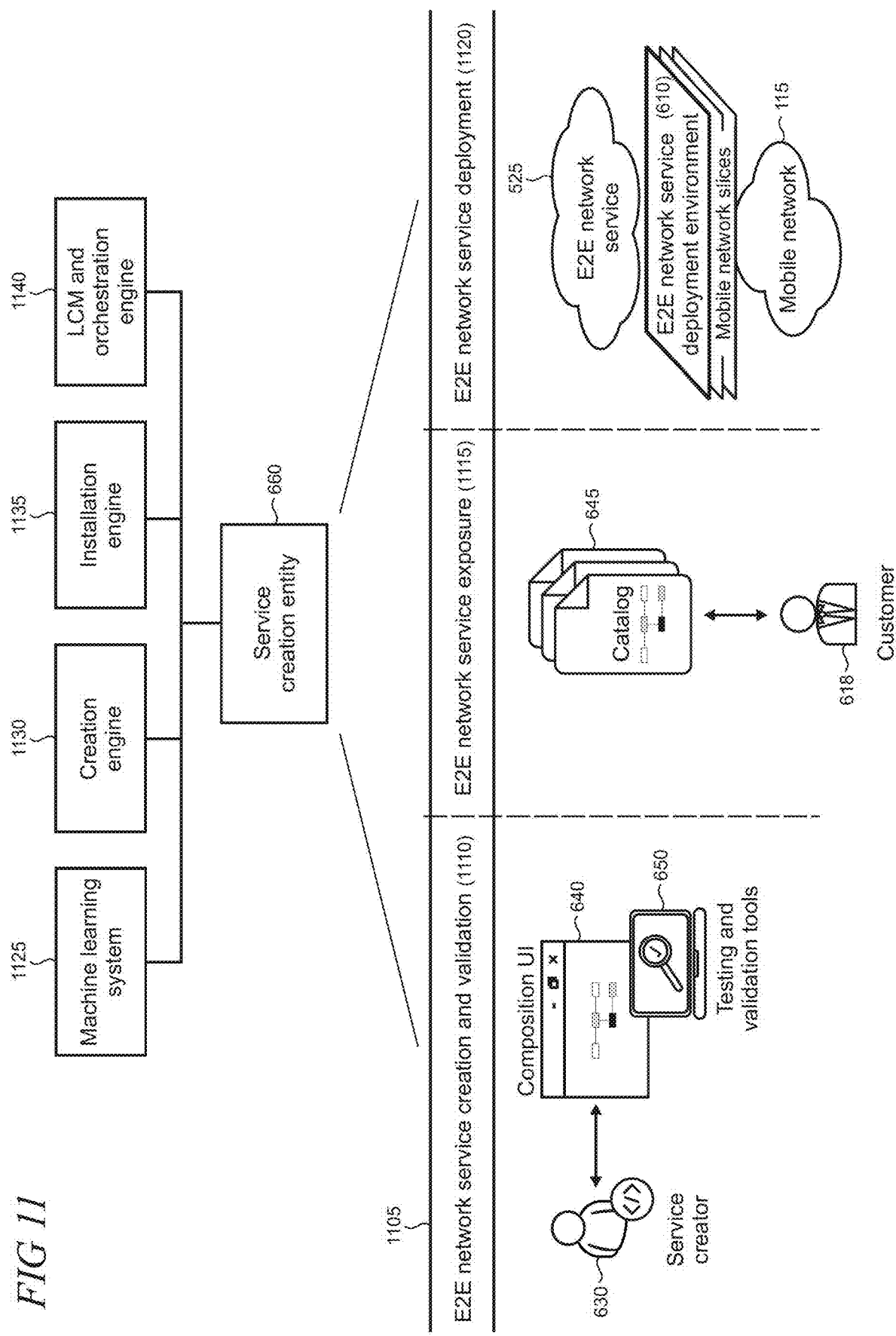
FIG. 11 shows functions provided by an illustrative network service creation entity.

As discussed above, the service creation entity 660 (FIG. 6) is a principal component in the present service delivery system 600. FIG. 11 shows illustrative functions provided by the service creation entity. The service creation entity provides overall management and control of an end-to-end network service delivery pipeline 1105 that comprises service creation and validation 1110, service exposure 1115, and service deployment 1120 in the customer's deployment environment 610 such as a slice of a mobile network 115. The service creation entity 660 is interoperable with functional components including a machine learning system 1125, a network service creation engine 1130, a network service installation engine 1135, and an LCM and orchestration engine 1140.

Figure 12:
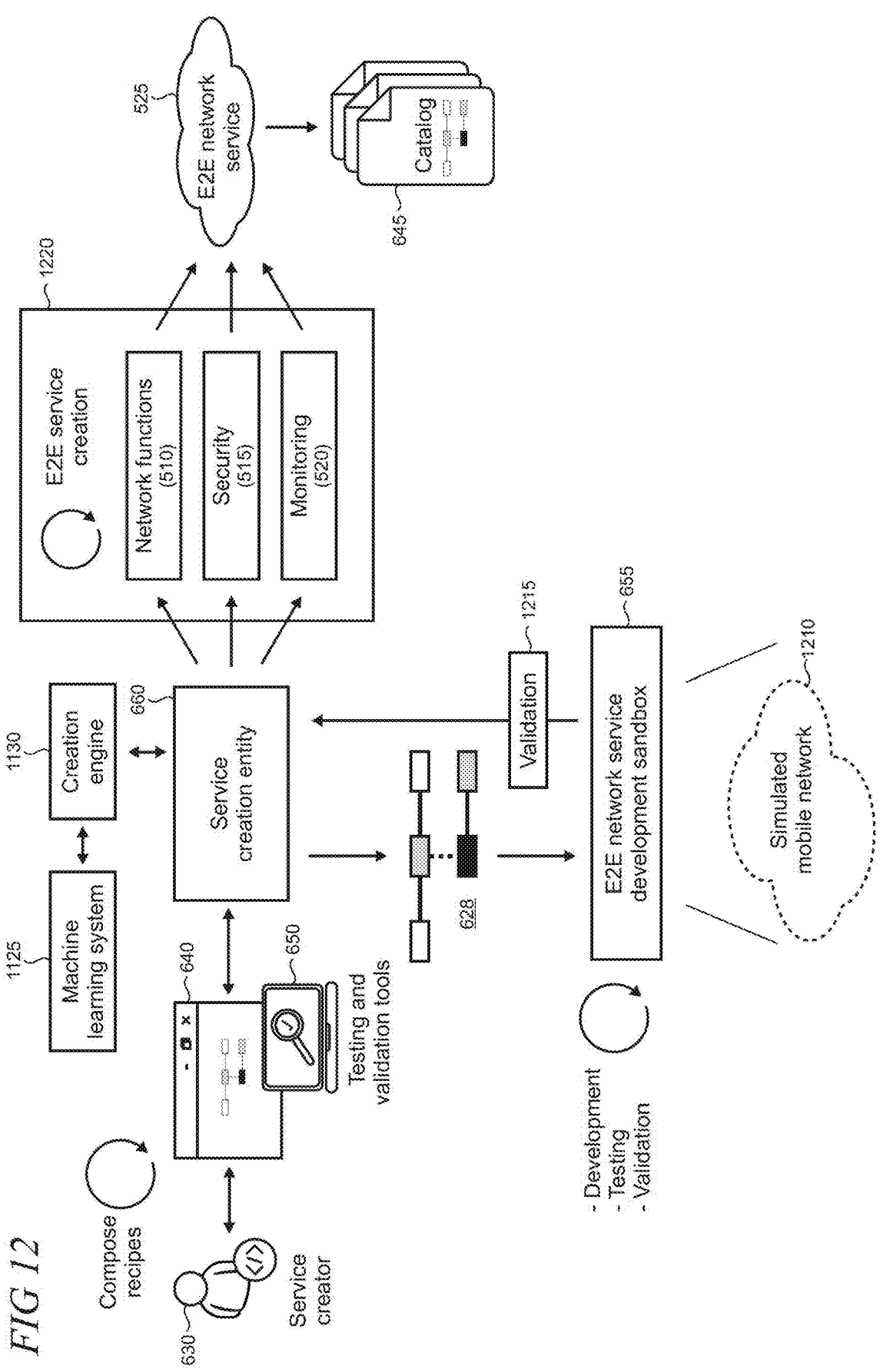
FIG. 12 shows an overview of an illustrative workflow for end-to-end network service composition and verification.

FIG. 12 shows an overview of an illustrative workflow for the end-to-end network service creation and validation portion of the pipeline 1105 (FIG. 11). The service creation entity 660 interoperates with the network service creation engine 1130 to expose the UI 640 to service creators 630 to facilitate the composition of network service recipes 628. The creation engine is adapted to provide abstractions of the components in the libraries 670 (FIG. 6) that implement the service functions. The abstractions enable the service creators to select the components that compose an end-to-end service and place them on an appropriate service chain path. The abstraction advantageously enables the service creators to compose and develop recipes for rich and complex services without being concerned with the underlying implementation details.

The creation engine 1130 facilitates a recipe composition having accurate service function instantiation and placement within a service graph (e.g., graph 900 in FIG. 9) by optimizing resource allocation and provisioning to ensure that an installed end-to-end service does not get starved for resources or waste resources by idling unnecessary or duplicate service functions. In some cases, the creation engine determines service chaining by considering constraints imposed by a specific customer's deployment environment 610 (FIG. 6) as well as customer policies and preferences. For example, some customer policies may prioritize cost minimization while other policies may emphasize performance metrics such as latency and bandwidth. In other cases, the recipes are composed with general applicability to mobile networks without considering specific policies.

The creation engine 1130 is operatively coupled with the machine learning system 1125 in some implementations of the service creation entity 660 to assist in automating service composition processing including service function chaining, resource allocation, and provisioning. For example, some components and corresponding tasks are directly mappable to conventional manual operations. In other situations, automated tasks are newly created and implemented with the help of machine learning.

The service creation entity 660 manages processes in which composed recipes are stress tested and further developed and/or adapted as appropriate in the development sandbox 655. The development sandbox includes simulations 1210 of one or more mobile networks. The simulated mobile networks correspond to actual customer networks in some applications or are models of common or representative mobile network types in other applications. The simulated networks are secure and isolated from the customer's deployment environments to ensure that the stress testing does not affect production network resources or services.

The service creation entity 660 creates end-to-end network services 525 in response to validation 1215 of stress tested recipes using a service creation process 1220 that provisions suitable network functions 510 and associated security 515 and monitoring 520. The created services are included in the catalog 645. The service creation processes are fully automated in most implementations by leveraging capabilities of the machine learning system 1125.

Figure 13:
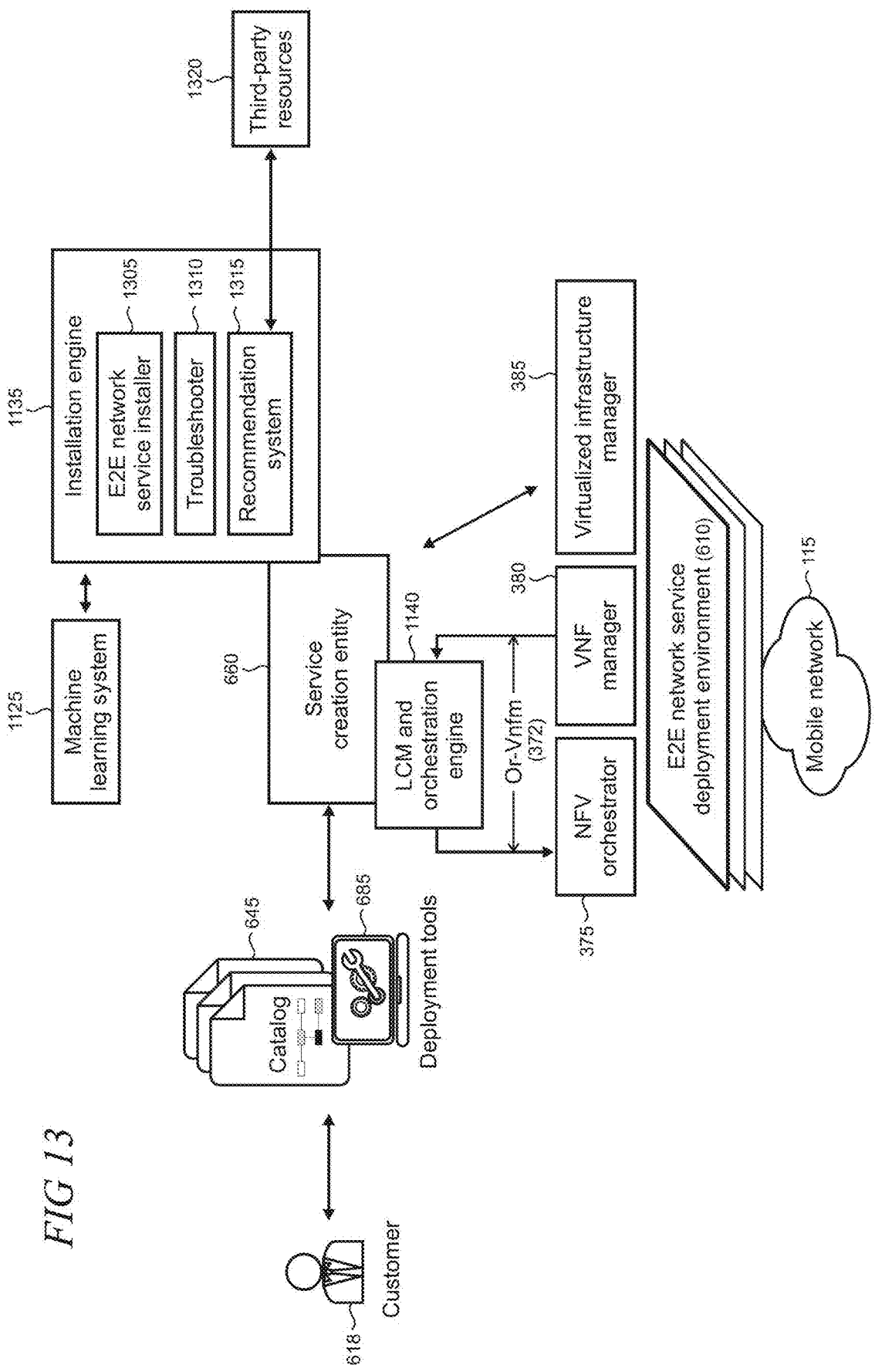
FIG. 13 shows an overview of illustrative deployment workflow for an end-to-end network service.

FIG. 13 shows an overview of an illustrative workflow for the end-to-end network service deployment portion 1120 (FIG. 11) of the pipeline 1105. The service creation entity 660 exposes the catalog 645 to the customer 618 through a UI from which an end-to-end service is selected from deployment in the customer's deployment environment 610 in the mobile network 115. The deployment tools 685 are also exposed to facilitate customer management and control over service deployment. The tools include monitoring capabilities in some implementations to enable the customer to monitor deployment, events, and performance associated with a given end-to-end service.

In response to a customer's end-to-end network service selection from the catalog 645, the service creation entity 660 interoperates with the installation engine 1135 that supports an installer 1305, troubleshooter 1310, and recommendation system 1315 that interacts with various third-party resources 1320. During installation and deployment of a customer-selected network service, the service creation entity interacts with the customer 618 through the deployment tools 685 and elements of the mobile network 115 including the NFVO 375, VNFM 380, and VIM 385 that support network function instantiation in the deployment environment 610. More specifically, the installation engine executes automated installation routines to enable the allocation of required mobile network resources and instantiation of the network functions underlying the selected end-to-end service in the deployment environment. For example, the installation engine performs changes to mobile networks such as configuration of security groups, changing firewall rules, installing and configuring load balancers, IP (Internet Protocol) address management, and the like. The installation engine also ensures that the installed end-to-end service components are accessible to various monitoring and operations, administration, and maintenance (OAM) systems in the mobile network.

The troubleshooter 1310 monitors the end-to-end network service deployment, proactively identifies issues, performs root cause analysis of deployment errors, and provides alerts through the deployment tools 685. The troubleshooter typically interoperates with the recommendation system 1315 to provide suggestions to the customer 618 to resolve deployment issues. For example, insufficient resource availability may be a root cause for an end-to-end network service deployment failure. The recommendation system can surface a notification through the deployment tools that the customer can action to get more detailed information about the resource shortfall and learn of potential solutions. For example, the notification could direct the customer to additional storage resources that could be added to the deployment environment to support a selected end-to-end network service.

In this illustrative example, the LCM and orchestration engine 1140 operates over the Or-Vnfm interface 372 between the NFVO 375 and VNFM 380. The LCM and orchestration engine implements automated workflows for VNF LCM for the provision, management, and re-optimization of network services. Typical actions including deploying, scaling, healing, pausing/resuming, on-demand monitoring requests, and upgrades across each of the diverse domains in the physical infrastructure underlying the deployment environment 610 in the mobile network 115. Based on the received service requests at the LCM and orchestration engine, available infrastructure resources and the topological properties of the underlying network infrastructure, the LCM and orchestration engine executes a deployment plan that fulfills the network function and connectivity requirements of the end-to-end service. In parallel, the LCM and orchestration engine monitors the performance of all deployed services and dynamically adjusts the infrastructure configuration to continuously ensure the performance guarantees and customer policies, as applicable.

Figure 14:
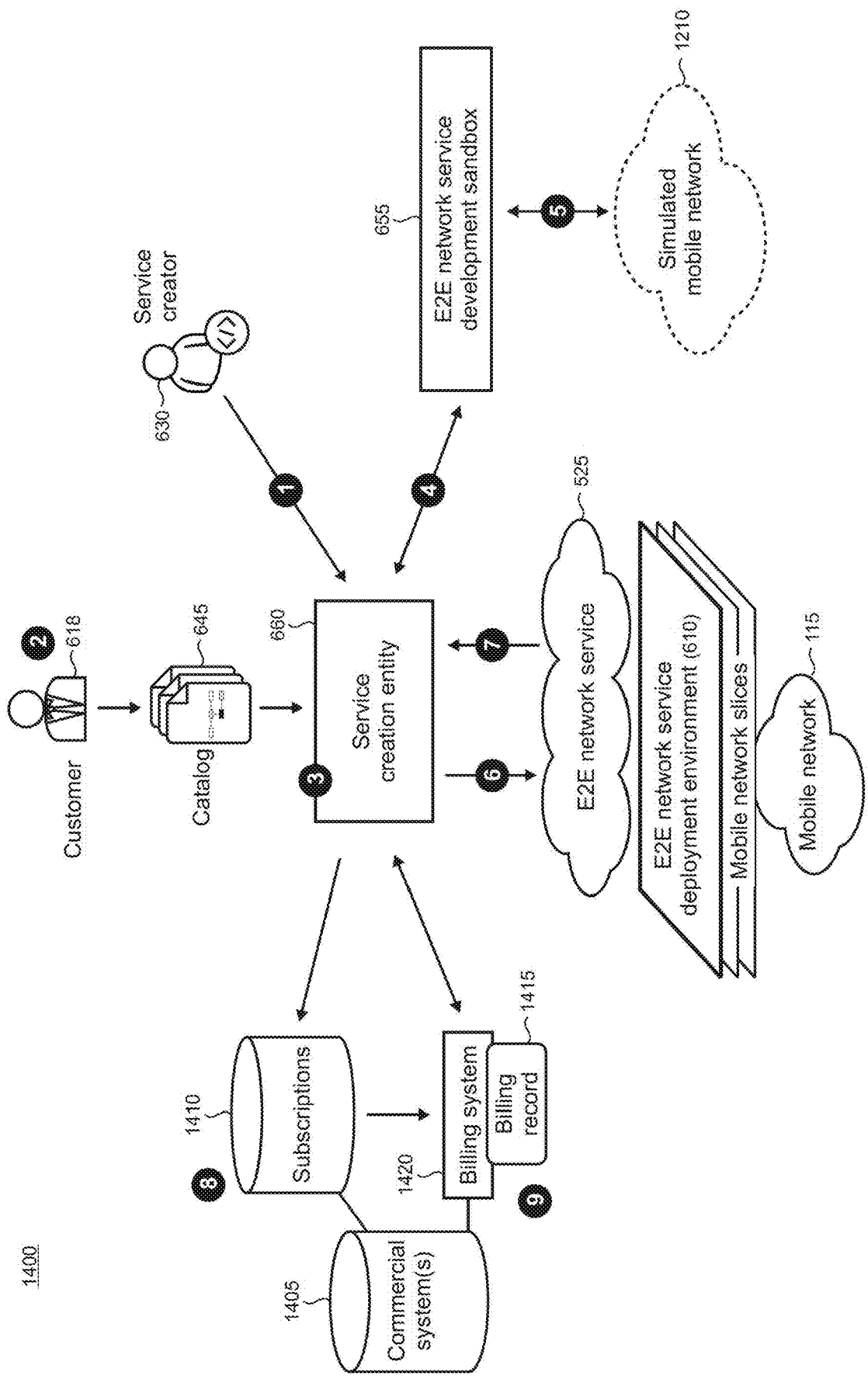
FIG. 14 shows an illustrative signal flow associated with on-boarding new end-to-end services by a customer at a mobile network operator or enterprise.

FIG. 14 shows an illustrative signal flow 1400 associated with on-boarding new end-to-end services by a customer 618 at an MNO or enterprise in accordance with the present principles. At step 1, a service creator 630 composes recipes for end-to-end network services. At step 2, the customer selects a network service from the catalog 645. At step 3, the service creation entity 660 creates the end-to-end network service from a suitable composed recipe which is tested and validated using the sandbox at step 4.

The simulated mobile network 1210 supporting the sandbox 655 provides updates to its constituent server infrastructure for the requisite stress testing in step 5 to provide validation upon success back to the service creation entity 660. The service creation entity installs the end-to-end network service 525 in the customer's deployment environment 610 at step 6. The deployment environment notifies the service creation entity of a successful installation at step 7. The service creation entity interacts with a commercial system 1405 to update the customer's subscription 1410 at step 8 and creates a suitable billing record 1415 in a billing system 1420 at step 9.

Figure 15:
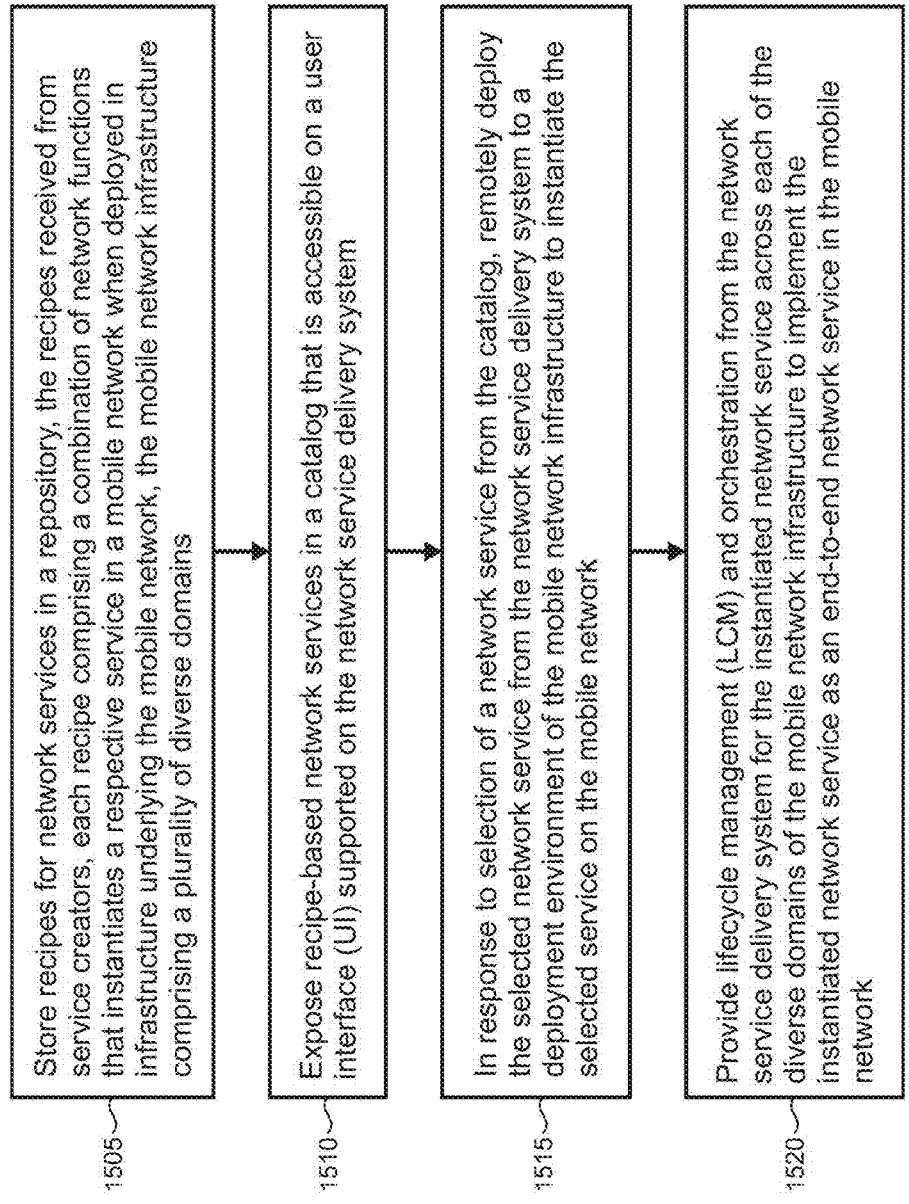
FIGS. 15, 16, and 17 show illustrative methods performed when implementing embodiments of the present end-to-end network service principles.

FIG. 15 is a flowchart of an illustrative method 1500 that is performable by a computing device for distributing network services over a communications network from a network service delivery system. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps are optionally utilized.

Block 1505 includes storing recipes for network services in a repository, the recipes received from service creators, each recipe comprising a combination of network functions that instantiates a respective service in a mobile network when deployed in infrastructure underlying the mobile network, the mobile network infrastructure comprising a plurality of diverse domains. Block 1510 includes exposing recipe-based network services in a catalog that is accessible on a user interface (UI) supported on the network service delivery system.

Block 1515 includes, in response to selection of a network service from the catalog, remotely deploying the selected network service from the network service delivery system to a deployment environment of the mobile network infrastructure to instantiate the selected service on the mobile network. Block 1520 includes providing lifecycle management (LCM) and orchestration from the network service delivery system for the instantiated network service across each of the diverse domains of the mobile network infrastructure to implement the instantiated network service as an end-to-end network service in the mobile network.

Figure 16:
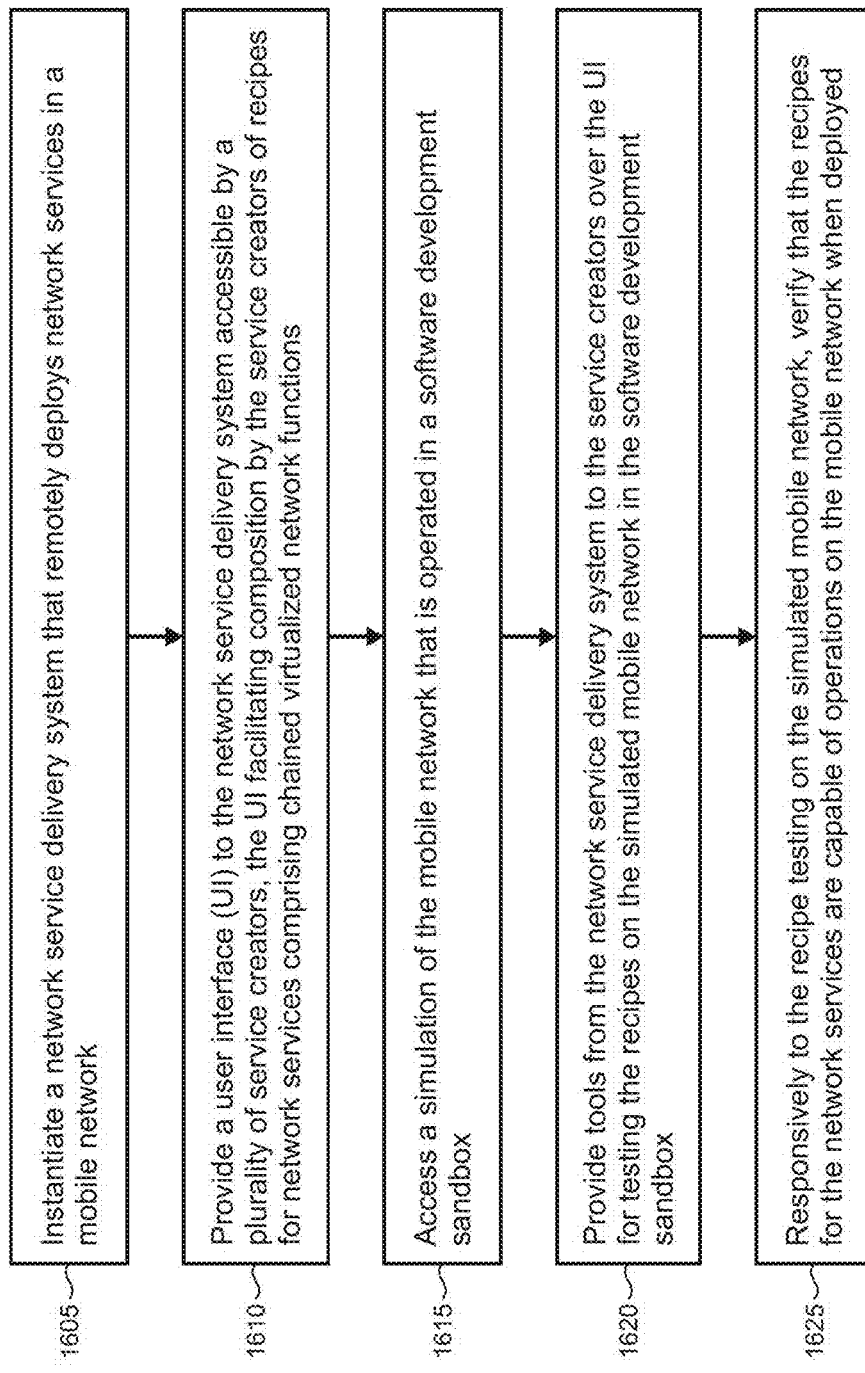

FIG. 16 is a flowchart of an illustrative method 1600 that is performable by a computing device. Block 1605 includes instantiating a network service delivery system that remotely deploys network services in a mobile network. Block 1610 includes providing a user interface (UI) to the network service delivery system accessible by a plurality of service creators, the UI facilitating composition by the service creators of recipes for network services comprising chained virtualized network functions.

Block 1615 includes accessing a simulation of the mobile network that is operated in a software development sandbox. Block 1620 includes providing tools from the network service delivery system to the service creators over the UI for testing the recipes on the simulated mobile network in the software development sandbox. Block 1625 includes, responsively to the recipe testing on the simulated mobile network, verifying that the recipes for the network services are capable of operations on the mobile network when deployed.

Figure 17:
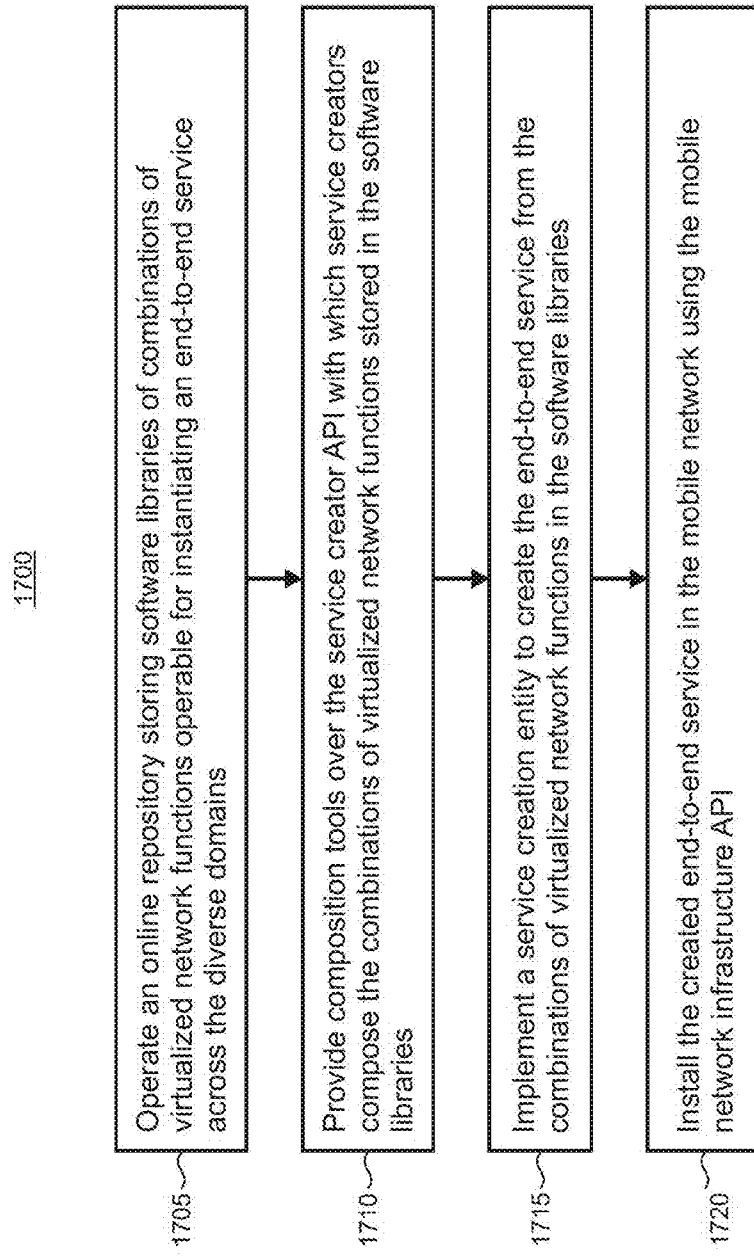

FIG. 17 is a flowchart of an illustrative method 1700 that is performable by a computing device in a mobile network delivery system. The computing device includes one or more processors; memory in electronic communication with the one or more processors; a service creator application programming interface (API) stored in the memory for facilitating interactions between the network service delivery system and a plurality of computing systems respectively associated with a plurality of different service creators; a mobile network infrastructure API stored in the memory for facilitating interactions between the network service delivery system and infrastructure underlying a mobile network having diverse domains comprising one or more of private or public cloud computing infrastructure utilized to implement an access network or core network of the mobile network; and one or more hardware-based non-transitory computer-readable storage devices having computer-executable instructions stored thereon.

Block 1705 includes operating an online repository storing software libraries of combinations of virtualized network functions operable for instantiating an end-to-end service across the diverse domains. Block 1710 includes providing composition tools over the service creator API with which service creators compose the combinations of virtualized network functions stored in the software libraries.

Block 1715 includes implementing a service creation entity to create the end-to-end service from the combinations of virtualized network functions in the software libraries. Block 1720 includes installing the created end-to-end service in the mobile network using the mobile network infrastructure API.

Figure 18:
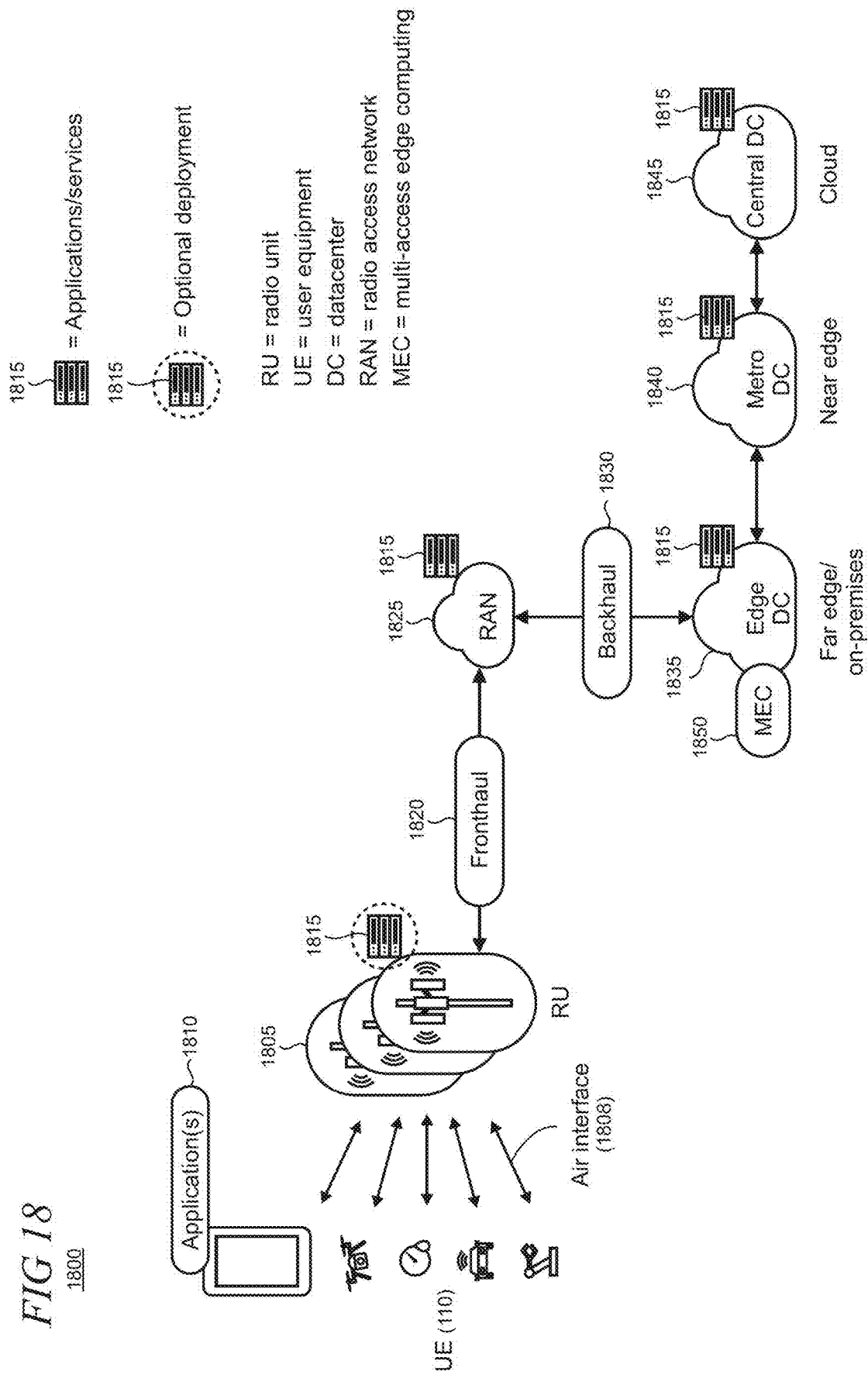
FIG. 18 shows illustrative physical infrastructure in a mobile network.

FIG. 18 shows illustrative physical infrastructure in a 5G mobile network 1800. Multiple instances of a radio unit (RU) 1805 are configured to interact with a diverse population of UE 110 over an air interface 1808. Each UE typically includes one or more local applications 1810 or client-side software/firmware component that is arranged to interface with one or more remote application servers, service providers, or other resources (collectively indicated by reference numeral 1815) and thus require network connectivity to such remote facilities.

The RUs are coupled by the mobile fronthaul 1820 to a RAN 1825. The RAN is coupled by the mobile backhaul 1830 to one or more datacenters (DCs). In this illustrative example, the DCs comprise an edge DC 1835, a metro DC 1840, and a central DC 1845. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 1850.

The application servers 1815 can be located at various points in the network architecture 1800 to meet technical requirements and traffic demands. Typically, the application servers will be physically located closer to the UE 110 in cases where latency is sought to be minimized. However, an operator's application server location criteria may also consider factors such as management ease, scalability, and security, among other factors. In some implementations, an operator may optionally deploy application servers and other resources in the RAN 1825 or RU 1805, as indicated by the dashed circles in FIG. 18.

Figure 19:
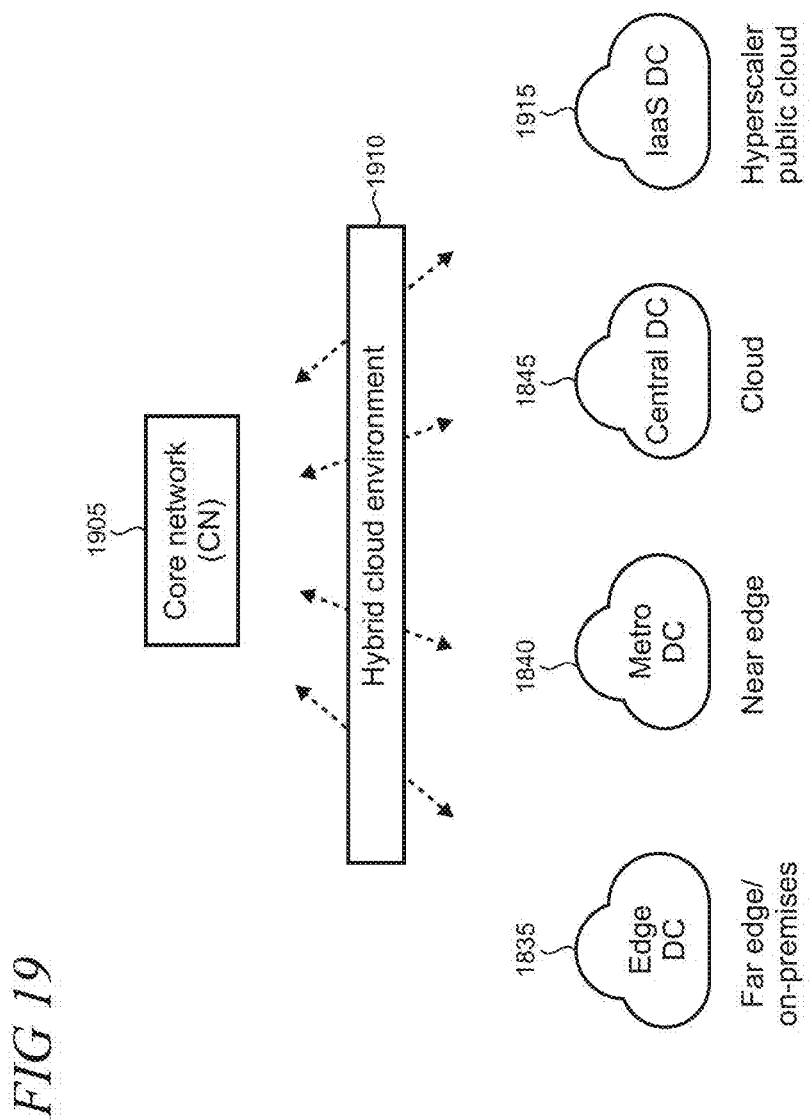
FIG. 19 shows an illustrative 5G core network (CN) that may be implemented using a hybrid cloud environment.

FIG. 19 shows an illustrative 5G core network (CN) 1905 that may be implemented using a hybrid cloud environment 1910 that may comprise a combination of private and/or public cloud networks. In this example, the edge DC 1835, metro DC 1840, and central DC 1845 may be associated with a private cloud. A hyperscaler public cloud supports an IaaS (Infrastructure as a Service) DC 1915. It is noted that the present end-to-end service principles are utilizable in AN and/or CN portions of a mobile network as implemented in private, public, or hybrid cloud-computing networks.

Figure 20:
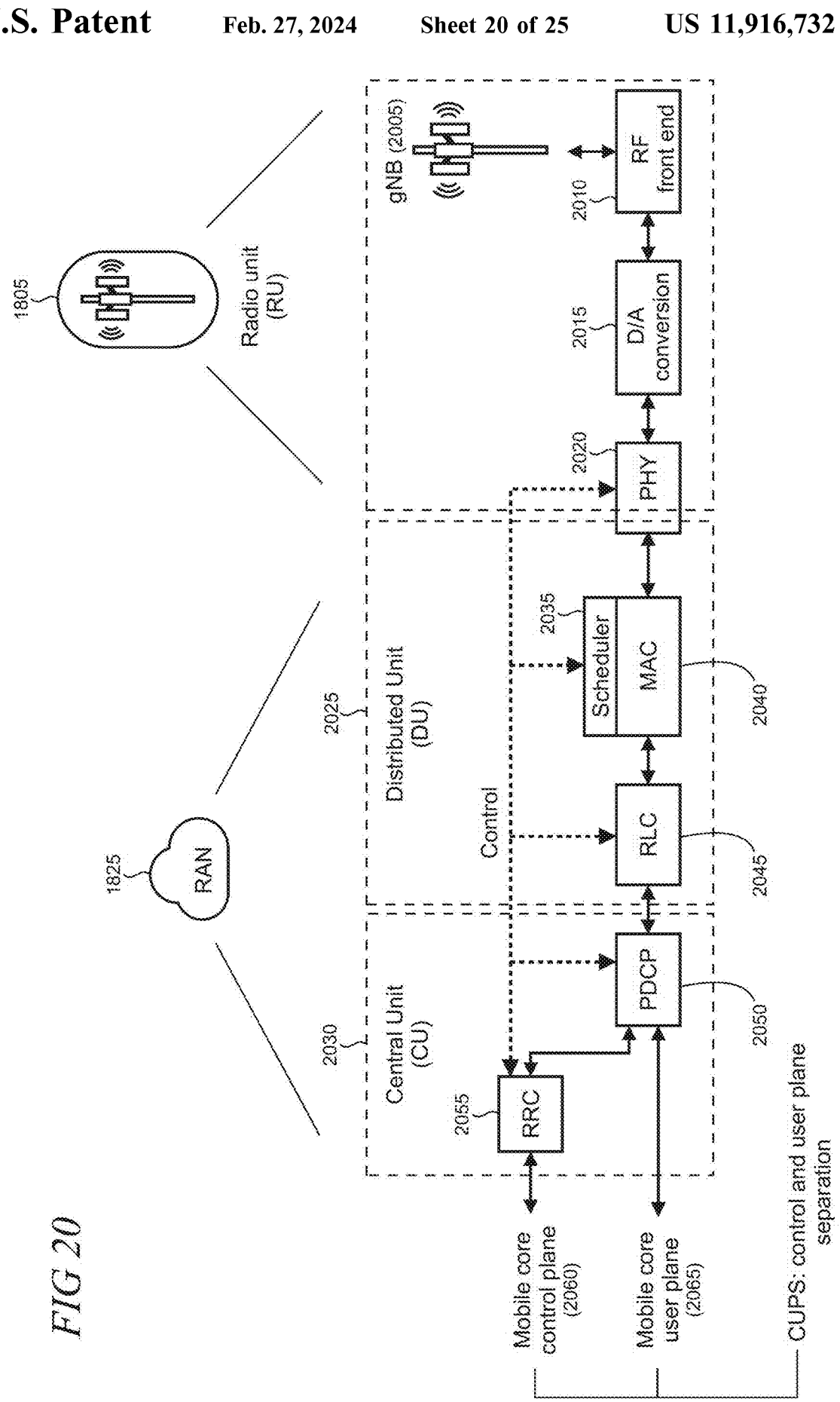
FIG. 20 shows an illustrative 5G radio access network (RAN) and radio unit (RU)

FIG. 20 shows functional blocks of the RAN 1825 and RU 1805. The RU comprises radio transmission points, for example, a next generation Node B, gNB 2005, which handles radio communications with the UE. The gNB is serially coupled to a radio frequency (RF) front end 2010, a digital to analog (D/A) conversion unit 2015, and a portion of the functionality of the physical (PHY) layer 2020 as described in the OSI (Open Systems Interconnection) model.

Under 3GPP and O-RAN (Open RAN) Alliance, the processing pipeline of the RAN 1825 is split into a distributed unit (DU) 2025, and a central unit (CU) 2030. The DU is responsible for real-time layers 1 and 2 (L1 and L2) scheduling functions, and the CU is responsible for non-real-time, higher L2 and L3 functions. Accordingly, the DU comprises a scheduler 2035 located on top of a MAC (Medium Access Control) layer component 2040, an RLC (radio link control) layer component 2045, and parts of a PHY (physical) layer component 2020. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 2030 is configured with a PDCP (Packet Data Convergence Protocol) layer component 2050 and RRC (Radio Resource Control) layer component 2055. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 2060 while the PDCP layer component interfaces with the user plane 2065 to thereby implement the "CUPS" feature of 5G (control and user plane separation).

The split-RAN configuration shown in FIG. 20 enables RAN functionality to be split among physical infrastructure elements in centralized and distributed locations. For example, a single CU 2030 may be configured to serve multiple DUs 2025, each of which in turn serves multiple RUs 1805.

Figure 21:
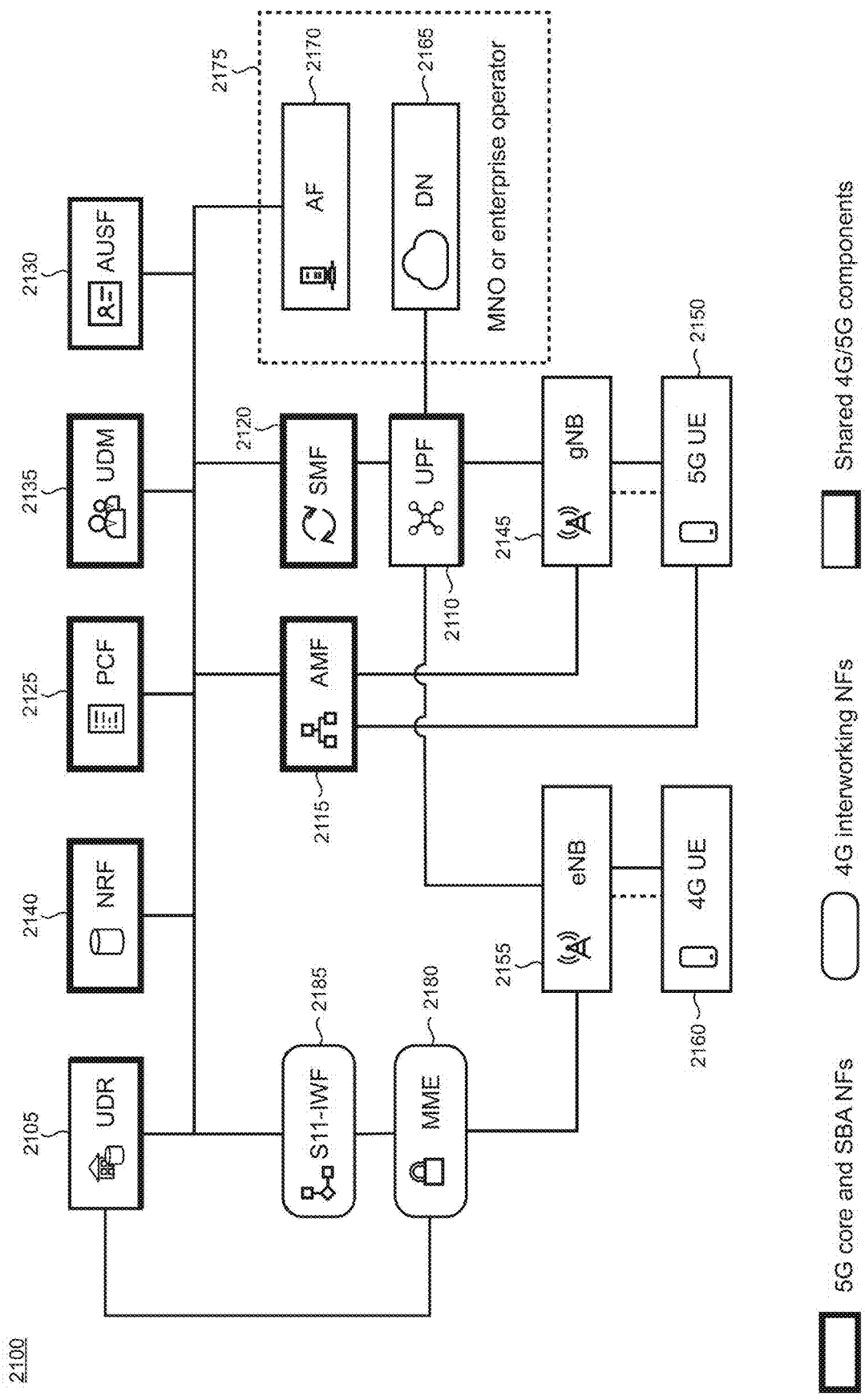
FIG. 21 shows details of an illustrative 5G CN architecture.

FIG. 21 shows details of an illustrative 5G network core architecture 2100 that includes 4G packet core instances to enable some 4G LTE use cases when implementing the present end-to-end service principles. With 4G mode, some 5G components such as the Unified Data Repository (UDR) 2105 and UPF 2110 support 4G mode without the need to revert to a legacy 4G stack. Other 5G components in the architecture include Access and Mobility Management Function (AMF) 2115; Session Management Function (SMF) 2120; Policy Control Function (PCF) 2125; Authentication Server Function (AUSF) 2130; Unified Data Management (UDM) 2135; and Network Repository Function (NRF) 2140.

The UPF 2110 interfaces with a gNB 2145 to support 5G UE 2150 and an eNB 2155 to support 4G UE 2160. The UPF further provides an interconnection point between the mobile network infrastructure and an external data network (DN) 2165. Application Function (AF) 2170 provides service or application related information to a VNF service consumer, for example, an MNO or enterprise operator 2175. Other 4G components include a Mobility Management Entity (MME) 2180 and Interworking Function (IWF) 2185.

Figure 22:
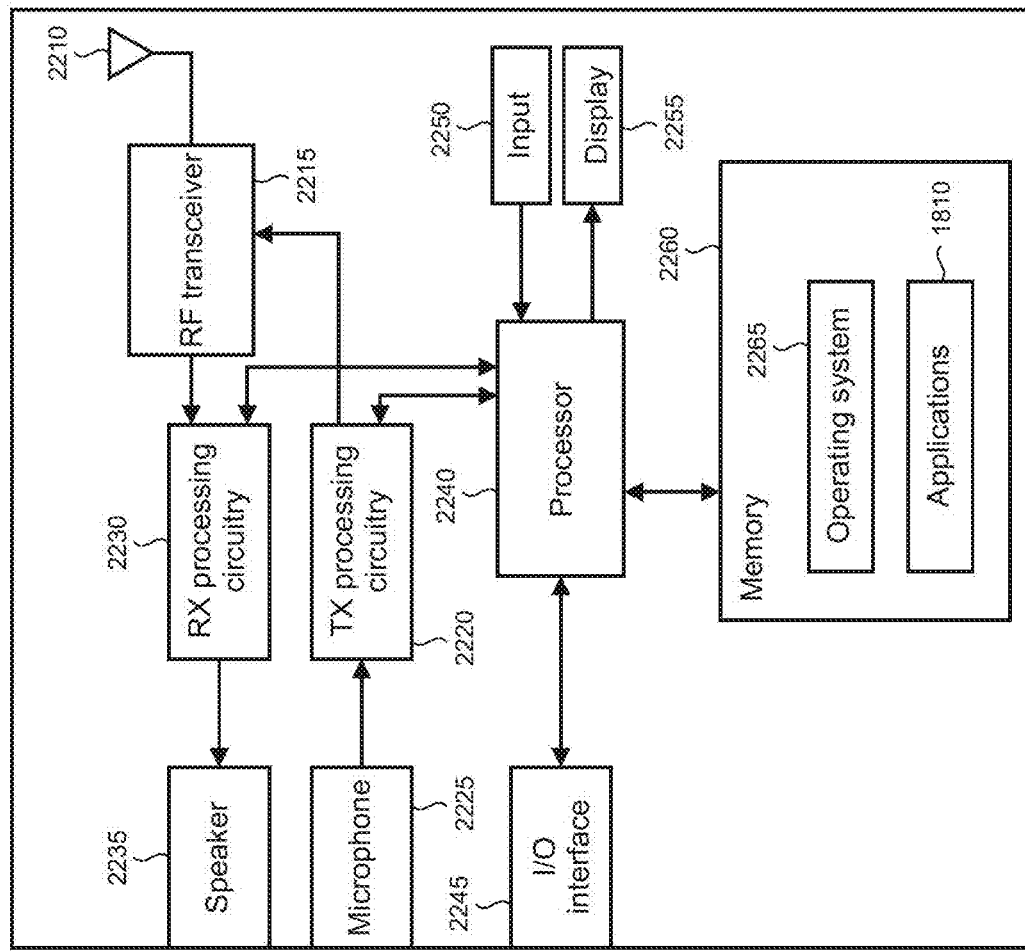
FIG. 22 is a block diagram for an illustrative user equipment (UE) usable to implement the present end-to-end network service principles.

FIG. 22 is a block diagram of an illustrative UE 110 that is usable to implement the present end-to-end service principles. The embodiment of the UE 110 shown in FIG. 22 is for illustration only, and the UEs 110 shown in the drawings and described in the preceding text may have the same or similar configuration. However, it is noted that UEs may come in a wide variety of configurations, and FIG. 22 does not limit the scope of the present disclosure to any particular implementation of a UE.

The UE 110 includes an antenna 2210, a radio frequency (RF) transceiver 2215, transmit (TX) processing circuitry 2220, a microphone 2225, and receive (RX) processing circuitry 2230. The UE 110 also includes a speaker 2235, a processor 2240, an input/output (I/O) interface 2245, an input device 2250, a display 2255, and a memory 2260. The memory includes an operating system (OS) program 2265 and one or more applications 1810.

The RF transceiver 2215 receives from the antenna 2210, an incoming RF signal transmitted by a gNB of a 5G network. The RF transceiver down-converts the incoming RF signal to generate an intermediate frequency (IF) or baseband signal. The IF or baseband signal is sent to the RX processing circuitry 2230, which generates a processed baseband signal by filtering, decoding, and/or digitizing the baseband or IF signal. The RX processing circuitry transmits the processed baseband signal to the speaker 2235 (such as for voice data) or to the processor 2240 for further processing (such as for web browsing data).

The TX processing circuitry 2220 receives analog or digital voice data from the microphone 2225 or other outgoing baseband data (such as web data, e-mail, or interactive video game data) from the processor 2240. The TX processing circuitry 2220 encodes, multiplexes, and/or digitizes the outgoing baseband data to generate a processed baseband or IF signal. The RF transceiver 2215 receives the outgoing processed baseband or IF signal from the TX processing circuitry and up-converts the baseband or IF signal to an RF signal that is transmitted via the antenna.

The processor 2240 can include one or more processors or other processing devices and execute the OS program 2265 stored in the memory 2260 to control the overall operation of the UE 110. For example, the processor may control the reception of forward channel signals and the transmission of reverse channel signals by the RF transceiver 2215, the RX processing circuitry 2230, and the TX processing circuitry 2220 in accordance with well-known principles. In some embodiments, the processor 2240 includes at least one microprocessor or microcontroller.

The processor 2240 may be configured for executing other processes and programs resident in the memory 2260, such as operations for CSI measurement and reporting for systems described in embodiments of the present disclosure.

The processor can move data into or out of the memory as required by an executing process. In some embodiments, the processor may be configured to execute the applications 1810 based on the OS program 2265 or in response to signals received from gNBs or an operator. The processor is also coupled to the I/O interface 2245, which provides the UE 110 with the ability to connect to other computing devices such as laptop computers and handheld computers. The I/O interface may thus function as a communication path between such accessories and the processor.

The processor 2240 is also coupled to the input device 2250 (e.g., keypad, touchscreen, buttons etc.) and the display 2255. A user of the UE 110 can typically employ the input device to enter data into the UE. For example, the display can be a liquid crystal display or other display capable of rendering text and/or graphics, video, etc. from web sites, applications, and/or service providers.

The memory 2260 is coupled to the processor 2240. Part of the memory may include a random access memory (RAM), and another part of the memory may include a Flash memory or other read-only memory (ROM).

As described in more detail below, the UE 110 can perform signaling and calculation for channel state information (CSI) reporting. Although FIG. 22 shows one illustrative example of UE 110, it may be appreciated that various changes may be made to the drawing. For example, various components may be combined, further subdivided, or omitted, and additional components may be added according to particular needs. As a particular example, the processor 2240 may be divided into multiple processors, such as one or more CPUs and one or more graphics processing units (GPUs). Also, while FIG. 22 depicts the UE 110 as configured as a mobile device, such as a smartphone, UEs may be configured to operate as other types of portable or stationary devices.

Figure 23:
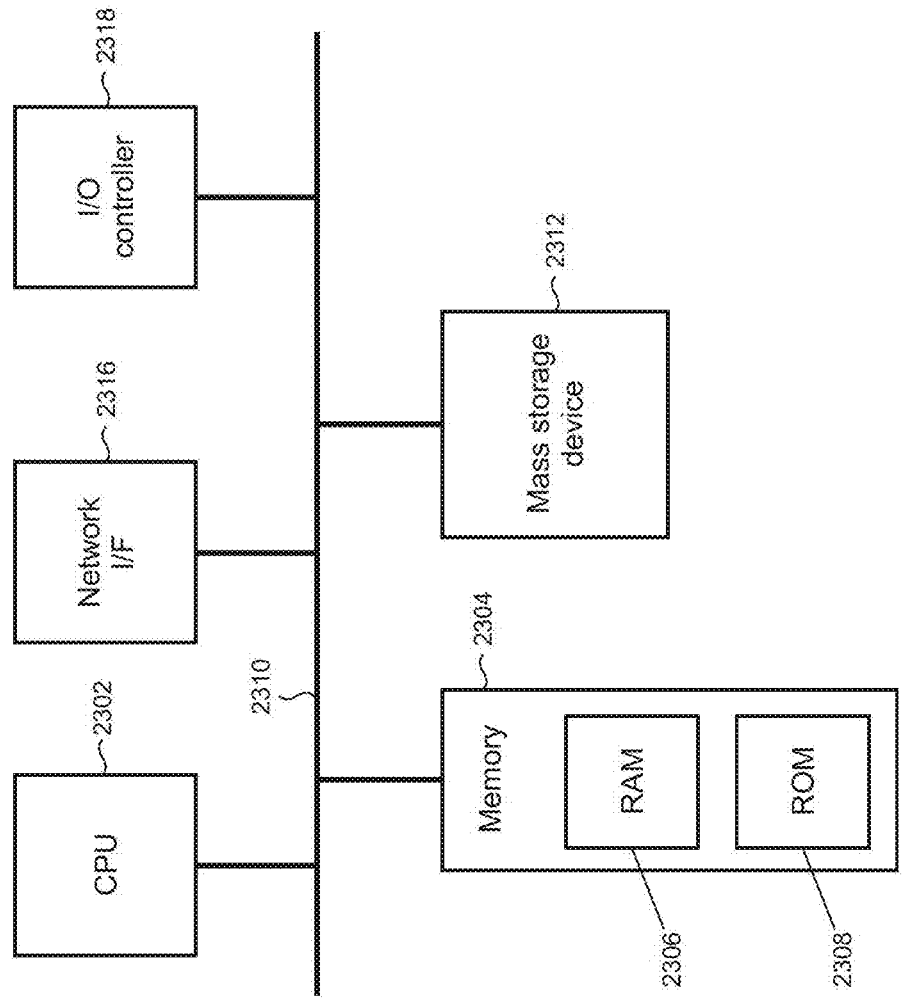
FIG. 23 is a block diagram of an illustrative server or computing device usable at least in part to implement the present end-to-end network service principles.

FIG. 23 shows an illustrative architecture 2300 for a computing device, such as a server, capable of executing the various components described herein for the present end-to-end service principles. The architecture 2300 illustrated in FIG. 23 includes one or more processors 2302 (e.g., central processing unit, dedicated AI chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 may provide output to a display screen, user interface, a printer, or other type of output device (also not shown in FIG. 23).

It may be appreciated that the software components described herein may, when loaded into the processor 2302 and executed, transform the processor 2302 and the overall architecture 2300 from a general-purpose computing system into a special-purpose computing system customized to facilitate the functionality presented herein. The processor 2302 may be constructed from any number of transistors or other discrete circuit elements, which may individually or collectively assume any number of states. More specifically, the processor 2302 may operate as a finite-state machine, in response to executable instructions contained within the software modules disclosed herein. These computer-executable instructions may transform the processor 2302 by specifying how the processor 2302 transitions between states, thereby transforming the transistors or other discrete hardware elements constituting the processor 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2300 in order to store and execute the software components presented herein. It also may be appreciated that the architecture 2300 may include other types of computing devices, including wearable devices, handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
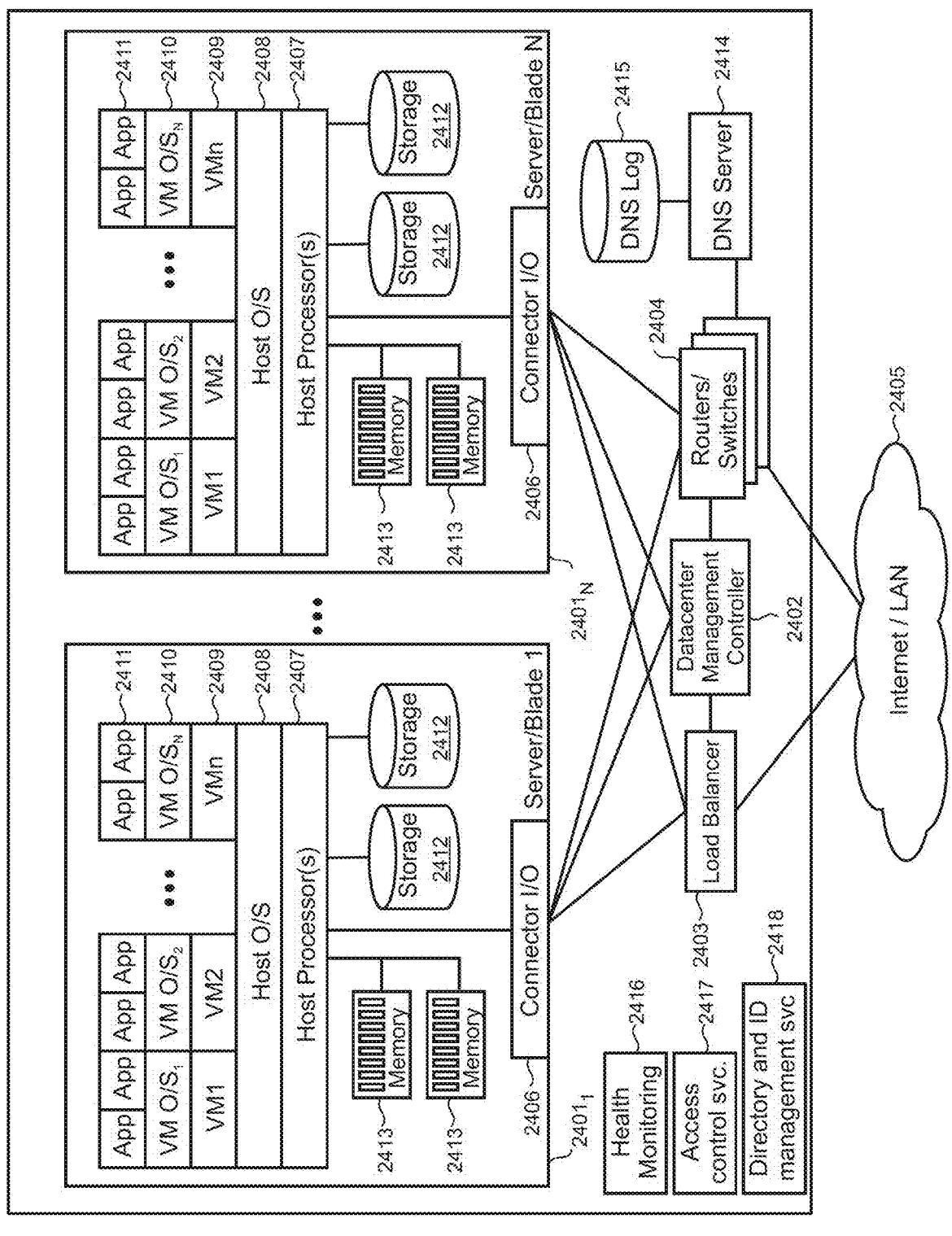
FIG. 24 is a block diagram of an illustrative datacenter usable at least in part to implement the present end-to-end network service principles.

FIG. 24 is a high-level block diagram of an illustrative datacenter 2400 that provides cloud computing services or distributed computing services that may be used to implement the present end-to-end service principles. Datacenter 2400 may incorporate one or more of the features disclosed in the DCs shown in the drawings and described in the accompanying text. A plurality of servers 2401 are managed by datacenter management controller 2402. Load balancer 2403 distributes requests and computing workloads over servers 2401 to avoid a situation wherein a single server may become overwhelmed. Load balancer 2403 maximizes available capacity and performance of the resources in datacenter 2400. Routers/switches 2404 support data traffic between servers 2401 and between datacenter 2400 and external resources and users (not shown) via an external network 2405, which may be, for example, a local area network (LAN) or the Internet.

Servers 2401 may be standalone computing devices, and/or they may be configured as individual blades in a rack of one or more server devices. Servers 2401 have an input/output (I/O) connector 2406 that manages communication with other database entities. One or more host processors 2407 on each server 2401 run a host operating system (O/S) 2408 that supports multiple virtual machines (VM) 2409. Each VM 2409 may run its own O/S so that each VM O/S 2410 on a server is different, or the same, or a mix of both. The VM O/Ss 2410 may be, for example, different versions of the same O/S (e.g., different VMs running different current and legacy versions of the Windows® operating system). In addition, or alternatively, the VM O/Ss 2410 may be provided by different manufacturers (e.g., some VMs running the Windows® operating system, while other VMs are running the Linux® operating system). Each VM 2409 may also run one or more applications (App) 2411. Each server 2401 also includes storage 2412 (e.g., hard disk drives (HDD)) and memory 2413 (e.g., RAM) that can be accessed and used by the host processors 2407 and VMs 2409 for storing software code, data, etc. In one embodiment, a VM 2409 may employ the data plane APIs as disclosed herein.

Datacenter 2400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2409 on server $2401_1$ to run their applications 2411. When demand for an application 2411 increases, the datacenter 2400 may activate additional VMs 2409 on the same server $2401_1$ and/or on a new server $2401_N$ as needed. These additional VMs 2409 can be deactivated if demand for the application later drops.

Datacenter 2400 may offer guaranteed availability, disaster recovery, and back-up services. For example, the datacenter may designate one VM 2409 on server $2401_1$ as the primary location for the tenant's application and may activate a second VM 2409 on the same or a different server as a standby or back-up in case the first VM or server $2401_1$ fails. The datacenter management controller 2402 automatically shifts incoming user requests from the primary VM to the back-up VM without requiring tenant intervention. Although datacenter 2400 is illustrated as a single location, it will be understood that servers 2401 may be distributed to multiple locations across the globe to provide additional redundancy and disaster recovery capabilities. Additionally, datacenter 2400 may be an on-premises, private system that provides services to a single enterprise user or may be a publicly accessible, distributed system that provides services to multiple, unrelated customers and tenants or may be a combination of both.

Domain Name System (DNS) server 2414 resolves domain and host names into IP addresses for all roles, applications, and services in datacenter 2400. DNS log 2415 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2416 monitors the health of the physical systems, software, and environment in datacenter 2400. Health monitoring 2416 provides feedback to datacenter managers when problems are detected with servers, blades, processors, or applications in datacenter 2400 or when network bandwidth or communications issues arise.

Access control service 2417 determines whether users are allowed to access particular connections and services provided at the datacenter 2400. Directory and identity management service 2418 authenticates user credentials for tenants on datacenter 2400.

Figure 25:
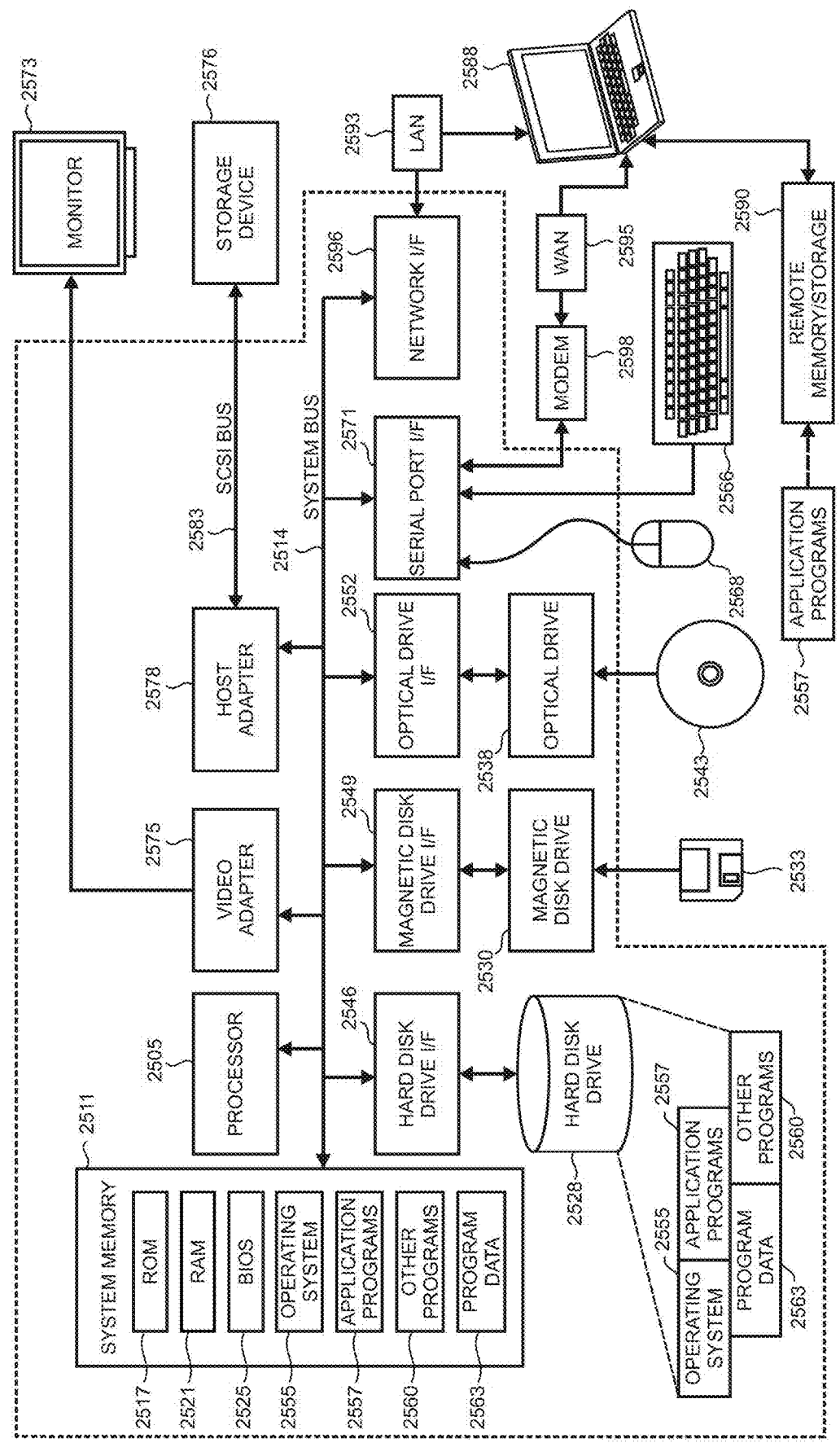
FIG. 25 is a simplified block diagram of an illustrative computer system usable at least in part to implement the present end-to-end network service principles.

FIG. 25 is a simplified block diagram of an illustrative computer system 2500 such as a PC, client machine, or server with which the present end-to-end service principles may be implemented. Computer system 2500 includes a processor 2505, a system memory 2511, and a system bus 2514 that couples various system components including the system memory 2511 to the processor 2505. The system bus 2514 may be any of several types of bus structures including a memory bus or memory controller, a peripheral bus, or a local bus using any of a variety of bus architectures. The system memory 2511 includes read only memory (ROM) 2517 and random access memory (RAM) 2521. A basic input/output system (BIOS) 2525, containing the basic routines that help to transfer information between elements within the computer system 2500, such as during startup, is stored in ROM 2517. The computer system 2500 may further include a hard disk drive 2528 for reading from and writing to an internally disposed hard disk (not shown), a magnetic disk drive 2530 for reading from or writing to a removable magnetic disk 2533 (e.g., a floppy disk), and an optical disk drive 2538 for reading from or writing to a removable optical disk 2543 such as a CD (compact disc), DVD (digital versatile disc), or other optical media. The hard disk drive 2528, magnetic disk drive 2530, and optical disk drive 2538 are connected to the system bus 2514 by a hard disk drive interface 2546, a magnetic disk drive interface 2549, and an optical drive interface 2552, respectively. The drives and their associated computer-readable storage media provide non-volatile storage of computer-readable instructions, data structures, program modules, and other data for the computer system 2500. Although this illustrative example includes a hard disk, a removable magnetic disk 2533, and a removable optical disk 2543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present end-to-end service principles. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2533, optical disk 2543, ROM 2517, or RAM 2521, including an operating system 2555, one or more application programs 2557, other program modules 2560, and program data 2563. A user may enter commands and information into the computer system 2500 through input devices such as a keyboard 2566 and pointing device 2568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2505 through a serial port interface 2571 that is coupled to the system bus 2514, but may be connected by other interfaces, such as a parallel port, game port, or universal serial bus (USB). A monitor 2573 or other type of display device is also connected to the system bus 2514 via an interface, such as a video adapter 2575. In addition to the monitor 2573, personal computers typically include other peripheral output devices (not shown), such as speakers and printers. The illustrative example shown in FIG. 25 also includes a host adapter 2578, a Small Computer System Interface (SCSI) bus 2583, and an external storage device 2576 connected to the SCSI bus 2583.

The computer system 2500 is operable in a networked environment using logical connections to one or more remote computers, such as a remote computer 2588. The remote computer 2588 may be selected as another personal computer, a server, a router, a network PC, a peer device, or other common network node, and typically includes many or all of the elements described above relative to the computer system 2500, although only a single representative remote memory/storage device 2590 is shown in FIG. 25. The logical connections depicted in FIG. 25 include a local area network (LAN) 2593 and a wide area network (WAN) 2595. Such networking environments are often deployed, for example, in offices, enterprise-wide computer networks, intranets, and the Internet.

When used in a LAN networking environment, the computer system 2500 is connected to the local area network 2593 through a network interface or adapter 2596. When used in a WAN networking environment, the computer system 2500 typically includes a broadband modem 2598, network gateway, or other means for establishing communications over the wide area network 2595, such as the Internet. The broadband modem 2598, which may be internal or external, is connected to the system bus 2514 via a serial port interface 2571. In a networked environment, program modules related to the computer system 2500, or portions thereof, may be stored in the remote memory storage device 2590. It is noted that the network connections shown in FIG. 25 are illustrative and other means of establishing a communications link between the computers may be used depending on the specific requirements of an application of the present end-to-end service principles.

Various exemplary embodiments of the present end-to-end service creation, management, and orchestration in mobile networks are now presented by way of illustration and not as an exhaustive list of all embodiments. An example includes a computer-implemented method for distributing network services over a communications network from a network service delivery system, comprising: storing recipes for network services in a repository, the recipes received from service creators, each recipe comprising a combination of network functions that instantiates a respective service in a mobile network when deployed in infrastructure underlying the mobile network, the mobile network infrastructure comprising a plurality of diverse domains; exposing recipe-based network services in a catalog that is accessible on a user interface (UI) supported on the network service delivery system; in response to selection of a network service from the catalog, remotely deploying the selected network service from the network service delivery system to a deployment environment of the mobile network infrastructure to instantiate the selected service on the mobile network; and providing lifecycle management (LCM) and orchestration from the network service delivery system for the instantiated network service across each of the diverse domains of the mobile network infrastructure to implement the instantiated network service as an end-to-end network service in the mobile network.

In another example, the deployment environment is controllable by the network service delivery system in accordance with predetermined mobile network policies and wherein the deployment environment includes one or more pre-provisioned resources supporting network service deployment and configuration by the network service delivery system. In another example, each recipe comprises a collection of network functions that are chained via service path. In another example, the computer-implemented method further includes a network service creation entity that implements security for the recipe-based network services using interactions with a virtualized infrastructure manager disposed in a management and orchestration (MANO) system associated with the mobile network. In another example, the computer-implemented method further includes a network service creation entity that implements monitoring for the recipe-based network services using interactions with an NFV (network function virtualization) orchestrator system associated with the mobile network. In another example, LCM orchestration is performed using an LCM orchestration engine that interoperates with a management and orchestration (MANO) system associated with the mobile network over an Or-Vnfm interface described by ETSI (European Telecommunications Standards Institute). In another example, the UI for the catalog is accessible by a user representing a mobile network service provider or representing an operator of an enterprise. In another example, the network services exposed on the UI in the catalog are available for operations on diverse cloud computing platforms that are implemented using one or more of private cloud, public cloud, or hybrid cloud. In another example, the mobile network comprises one of a fourth generation (4G) mobile network, a fifth generation (5G) mobile network, or a combined 4G and 5G mobile network.

A further example includes one or more hardware-based non-transitory computer-readable memory devices storing computer-executable instructions which, upon execution by one or more processors disposed in a computing device, cause the computing device to: instantiate a network service delivery system that remotely deploys network services in a mobile network; provide a user interface (UI) to the network service delivery system accessible by a plurality of service creators, the UI facilitating composition by the service creators of recipes for network services comprising chained virtualized network functions; access a simulation of the mobile network that is operated in a software development sandbox; provide tools from the network service delivery system to the service creators over the UI for testing the recipes on the simulated mobile network in the software development sandbox; responsively to the recipe testing on the simulated mobile network, verify that the recipes for the network services are capable of operations on the mobile network when deployed.

In another example, the executed instructions further cause the computing device to deploy a verified network service on the mobile network. In another example, the executed instructions further cause the computing device to provide lifecycle management (LCM) orchestration from the network service delivery system for the deployed service across each of diverse domains of infrastructure underlying the mobile network to implement the deployed network service as an end-to-end network service. In another example, the executed instructions further cause the computing device to use a verified recipe to create a service for deployment on the mobile network, the creating comprising associating monitoring and security functionalities with the chained virtualized network functions. In another example, the executed instructions further cause the computing device to expose the created service in a catalog to network service customers over a customer UI supported by the network service delivery system. In another example, the software development sandbox is isolated from a deployment environment in the mobile network.

A further example includes a computing device in a mobile network service delivery system, comprising: one or more processors; memory in electronic communication with the one or more processors; a service creator application programming interface (API) stored in the memory for facilitating interactions between the network service delivery system and a plurality of computing systems respectively associated with a plurality of different service creators; a mobile network infrastructure API stored in the memory for facilitating interactions between the network service delivery system and infrastructure underlying a mobile network having diverse domains comprising one or more of private or public cloud computing infrastructure utilized to implement an access network or core network of the mobile network, and one or more hardware-based non-transitory computer-readable storage devices having computer-executable instructions stored thereon which, when executed by the one or more processors, cause the computing device to operate an online repository storing software libraries of combinations of virtualized network functions operable for instantiating an end-to-end service across the diverse domains; provide composition tools over the service creator API with which service creators compose the combinations of virtualized network functions stored in the software libraries; implement a service creation entity to create the end-to-end service from the combinations of virtualized network functions in the software libraries; and install the created end-to-end service in the mobile network using the mobile network infrastructure API.

In another example, the computing device further comprises a machine learning system providing automation functions for the service creation entity during end-to-end service creation. In another example, the mobile network infrastructure API enables communications between the network service delivery system and a deployment environment in the mobile network to perform lifecycle management (LCM) orchestration for the end-to-end service across the diverse domains of the mobile network infrastructure. In another example, the executed instructions further cause the computing device to provide testing and verification tools over the service creator API to enable the service creators to test and verify the compositions in a software development sandbox that supports a simulation of the mobile network infrastructure. In another example, the executed instructions further cause the computing device to expose the combinations of virtualized network functions as entries in a services catalog to a customer for selection.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more hardware-based non-transitory computer-readable memory devices storing computer-executable instructions which, upon execution by one or more processors disposed in a computing device, cause the computing device to:

instantiate a network service delivery system that remotely deploys network services in a mobile network associated with a customer;

provide a user interface (UI) to the network service delivery system accessible by a plurality of service creators, the UI facilitating composition by the service creators of recipes for network services comprising chained virtualized network functions;

access a simulation of the mobile network that is operated in a software development sandbox;

provide tools from the network service delivery system to the service creators over the UI for testing the recipes on the simulated mobile network in the software development sandbox; and responsively to the recipe testing on the simulated mobile network, verify that the recipes for the network services are capable of interoperation with the mobile network when deployed in a deployment environment in the mobile network, the deployment environment being virtually isolated in the mobile network and the interoperation comprising accessing at least one of customer rules and policies, accessing customer resource managers, and possessing rights and permissions pertaining to the deployment environment.

2. The one or more hardware-based non-transitory computer-readable memory devices of claim 1 in which the executed instructions further cause the computing device to deploy a verified network service on the mobile network.

3. The one or more hardware-based non-transitory computer-readable memory devices of claim 1 in which the executed instructions further cause the computing device to provide lifecycle management (LCM) orchestration from the network service delivery system for the deployed service across each of diverse domains of infrastructure underlying the mobile network to implement the deployed network service as an end-to-end network service.

4. The one or more hardware-based non-transitory computer-readable memory devices of claim 1 in which the executed instructions further cause the computing device to use a verified recipe to create a service for deployment on the mobile network, the creating comprising associating monitoring and security functionalities with the chained virtualized network functions.

5. The one or more hardware-based non-transitory computer-readable memory devices of claim 4 in which the executed instructions further cause the computing device to expose the created service in a catalog to network service customers over a customer UI supported by the network service delivery system.

6. The one or more hardware-based non-transitory computer-readable memory devices of claim 1 in which the software development sandbox is isolated from the deployment environment in the mobile network.

7. A computing device in a mobile network service delivery system, comprising:
   one or more processors;
   memory in electronic communication with the one or more processors;
   a service creator application programming interface (API) stored in the memory for facilitating interactions between the network service delivery system and a plurality of computing systems respectively associated with a plurality of different service creators;
   a mobile network infrastructure API stored in the memory for facilitating interactions between the network service delivery system and infrastructure underlying a mobile network associated with a customer and having diverse domains comprising one or more of private or public cloud computing infrastructure utilized to implement an access network or core network of the mobile network; and
   one or more hardware-based non-transitory computer-readable storage devices having computer-executable instructions stored thereon which, when executed by the one or more processors, cause the computing device to
   operate an online repository storing software libraries of combinations of virtualized network functions operable for instantiating an end-to-end service across the diverse domains;
   provide composition tools over the service creator API with which service creators compose the combinations of virtualized network functions stored in the software libraries;
   implement a service creation entity to create the end-to-end service from the combinations of virtualized network functions in the software libraries;
   interoperate with a deployment environment in the mobile network, the deployment environment being virtually isolated in the mobile network and the interoperation comprising accessing at least one of customer rules and policies, accessing customer resource managers, and possessing rights and permissions pertaining to the deployment environment; and
   install the created end-to-end service in the deployment environment of the mobile network using the mobile network infrastructure API.

8. The computing device of claim 7 further comprising a machine learning system providing automation functions for the service creation entity during end-to-end service creation.

9. The computing device of claim 7 in which the mobile network infrastructure API enables communications between the network service delivery system and the deployment environment in the mobile network to perform lifecycle management (LCM) and orchestration for the end-to-end service across the diverse domains of the mobile network infrastructure.

10. The computing device of claim 7 in which the executed instructions further cause the computing device to provide testing and verification tools over the service creator API to enable the service creators to test and verify the compositions in a software development sandbox that supports a simulation of the mobile network infrastructure.

11. The computing device of claim 7 in which the executed instructions further cause the computing device to expose the combinations of virtualized network functions as entries in a services catalog to a customer for selection.

12. A computer-implemented method for distributing network services over a communications network from a network service delivery system, comprising:
   storing recipes for network services in a repository, the recipes received from service creators, each recipe comprising a combination of network functions that instantiates a respective service in a mobile network associated with a customer when deployed in a deployment environment that is virtually isolated in the mobile network and which comprises infrastructure underlying the mobile network, the mobile network infrastructure comprising a plurality of diverse domains;
   exposing recipe-based network services in a catalog that is accessible on a user interface (UI) supported on the network service delivery system;
   in response to selection of a network service from the catalog, remotely deploying the selected network service from the network service delivery system to the deployment environment of the mobile network infrastructure to instantiate the selected service on the mobile network; and
   providing lifecycle management (LCM) and orchestration from the network service delivery system for the instantiated network service across each of the diverse domains of the mobile network infrastructure to implement the instantiated network service as an end-to-end network service in the deployment environment of the mobile network, wherein the providing of LCM and orchestration includes interoperating with a deployment environment comprising accessing at least one of customer rules and policies, accessing customer resource managers, and possessing rights and permissions pertaining to the deployment environment.

13. The computer-implemented method of claim 12 in which the deployment environment is controllable by the network service delivery system in accordance with predetermined mobile network policies and wherein the deployment environment includes one or more pre-provisioned resources supporting network service deployment and configuration by the network service delivery system.

14. The computer-implemented method of claim 12 in which each recipe comprises a collection of network functions that are chained via service path.

15. The computer-implemented method of claim 12 further including a network service creation entity that implements security for the recipe-based network services using interactions with a virtualized infrastructure manager disposed in a management and orchestration (MANO) system associated with the mobile network.

16. The computer-implemented method of claim 12 further including a network service creation entity that implements monitoring for the recipe-based network services using interactions with an NFV (network function virtualization) orchestrator system associated with the mobile network.

17. The computer-implemented method of claim 12 in which LCM orchestration is performed using an LCM orchestration engine that interoperates with a management and orchestration (MANO) system associated with the mobile network over an Or-Vnfm interface described by ETSI (European Telecommunications Standards Institute).

18. The computer-implemented method of claim 12 in which the UI for the catalog is accessible by a user representing a mobile network service provider or representing an operator of an enterprise.

19. The computer-implemented method of claim 12 in which the network services exposed on the UI in the catalog are available for operations on diverse cloud computing platforms that are implemented using one or more of private cloud, public cloud, or hybrid cloud.

20. The computer-implemented method of claim 12 in which the mobile network comprises one of a fourth generation (4G) mobile network, a fifth generation (5G) mobile network, or a combined 4G and 5G mobile network.

* * * * *